(12) United States Patent
Katsuta et al.

(10) Patent No.: US 7,931,102 B2
(45) Date of Patent: Apr. 26, 2011

(54) POWER OUTPUT APPARATUS, VEHICLE EQUIPPED WITH POWER OUTPUT APPARATUS, AND CONTROL METHOD OF POWER OUTPUT APPARATUS

(75) Inventors: Hiroshi Katsuta, Toyota (JP); Hidehiro Oba, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 222 days.

(21) Appl. No.: 12/515,881

(22) PCT Filed: Nov. 14, 2007

(86) PCT No.: PCT/JP2007/072064
§ 371 (c)(1),
(2), (4) Date: May 21, 2009

(87) PCT Pub. No.: WO2008/062696
PCT Pub. Date: May 29, 2008

(65) Prior Publication Data
US 2010/0032217 A1    Feb. 11, 2010

(30) Foreign Application Priority Data
Nov. 22, 2006    (JP) .................................. 2006-315465

(51) Int. Cl.
*B60K 6/44* (2007.10)
(52) U.S. Cl. ................................. 180/65.225; 180/65.21
(58) Field of Classification Search ............. 180/65.225, 180/65.21, 65.235, 65.6
See application file for complete search history.

(56) References Cited

U.S. PATENT DOCUMENTS

| | | | | |
|---|---|---|---|---|
| 7,562,730 B2 * | 7/2009 | Shimizu et al. | ............. | 180/65.23 |
| 7,699,735 B2 * | 4/2010 | Conlon | .............................. | 475/5 |
| 2002/0023790 A1 * | 2/2002 | Hata et al. | ..................... | 180/65.3 |
| 2004/0046525 A1 | 3/2004 | Gale et al. | | |
| 2005/0137042 A1 | 6/2005 | Schmidt et al. | | |
| 2009/0301800 A1 * | 12/2009 | Oba et al. | ................... | 180/65.25 |
| 2010/0000814 A1 * | 1/2010 | Katsuta et al. | ........... | 180/65.265 |
| 2010/0018788 A1 * | 1/2010 | Katsuta et al. | ........... | 180/65.225 |
| 2010/0029436 A1 * | 2/2010 | Katsuta et al. | .................... | 477/5 |
| 2010/0032217 A1 * | 2/2010 | Katsuta et al. | ............. | 180/65.23 |
| 2010/0032218 A1 * | 2/2010 | Ideshio et al. | ........... | 180/65.225 |
| 2010/0051360 A1 * | 3/2010 | Oba et al. | .................. | 180/65.22 |
| 2010/0051361 A1 * | 3/2010 | Katsuta et al. | ............. | 180/65.23 |
| 2010/0078238 A1 * | 4/2010 | Oba et al. | ................. | 180/65.225 |
| 2010/0147610 A1 * | 6/2010 | Katsuta et al. | ........... | 180/65.265 |
| 2010/0152940 A1 * | 6/2010 | Mitsutani et al. | ............... | 701/22 |
| 2011/0024210 A1 * | 2/2011 | Holmes et al. | ............. | 180/65.25 |

FOREIGN PATENT DOCUMENTS

| | | |
|---|---|---|
| JP | 7-131994 A | 5/1995 |
| JP | 7-213095 A | 8/1995 |
| JP | 2002-135910 A | 5/2002 |
| JP | 2003-106389 A | 4/2003 |
| JP | 2004-182034 A | 7/2004 |
| JP | 2005-125876 A | 5/2005 |
| JP | 2005-155891 A | 6/2005 |

* cited by examiner

*Primary Examiner* — Paul N Dickson
*Assistant Examiner* — Drew Brown
(74) *Attorney, Agent, or Firm* — Kenyon & Kenyon LLP

(57) ABSTRACT

In a 2-motor drive mode with connection of both motors with a driveshaft by means of a transmission, a hybrid vehicle sets torque commands of the motors based on a torque demand set at step S110, in order to minimize the sum of a loss of the motors and to ensure output of a power equivalent to a preset torque demand to the driveshaft.

5 Claims, 12 Drawing Sheets

POWER OUTPUT APPARATUS, VEHICLE EQUIPPED WITH POWER OUTPUT APPARATUS, AND CONTROL METHOD OF POWER OUTPUT APPARATUS

This is a 371 national phase application of PCT/JP2007/072064 filed 14 Nov. 2007, claiming priority to Japanese Patent Application No. JP 2006-315465 filed 22 Nov. 2006, the contents of which are incorporated herein by reference.

TECHNICAL FIELD

The present invention relates to a power output apparatus configured to output power to a driveshaft, a vehicle equipped with such a power output apparatus, and a control method of such a power output apparatus.

BACKGROUND ART

One proposed structure of the power output apparatus includes an internal combustion engine, two motors, a Ravigneaux planetary gear mechanism, and a parallel shaft-type transmission arranged to selectively connect two output elements of the planetary gear mechanism to an output shaft (see, for example, Patent Document 1). Another proposed structure of the power output apparatus has a planetary gear mechanism including an input element connected with an internal combustion engine and two output elements, and a parallel shaft-type transmission including a countershaft connected with the respective output elements of the planetary gear mechanism (see, for example, Patent Document 2).

Patent Document 1: Japanese Patent Laid-Open No. 2005-155891
Patent Document 2: Japanese Patent Laid-Open No. 2003-106389

DISCLOSURE OF THE INVENTION

In the power output apparatuses of the prior art structures described in the above cited references, while the internal combustion engine is kept at stop, the output power from one of the motors is subjected to speed change by the transmission and is transmitted to an output shaft. It is, however, rather difficult to continuously output a relatively large torque with only one motor from the viewpoints of the energy efficiency and the potential heat generation in the motors.

In the power output apparatus equipped with two motors and a speed change-transmission assembly, there would thus be a demand for connecting both the two motors to a driveshaft by means of the speed change-transmission assembly and ensuring continuous output of a relatively large torque. There would also be a demand for adequately controlling the two motors in a state of connection of both the two motors with the driveshaft by means of the speed change-transmission assembly.

The present invention accomplishes at least part of the demands mentioned above and the other relevant demands by the following configurations applied to the power output apparatus and to the hybrid vehicle.

According to one aspect, the invention is directed to a power output apparatus configured to output power to a driveshaft. The power output apparatus includes: a first motor constructed to input and output power; a second motor constructed to input and output power; an accumulator arranged to transmit electric power to and from each of the first motor and the second motor; a speed change-transmission assembly configured to selectively connect either one or both of a rotating shaft of the first motor and a rotating shaft of the second motor to the driveshaft and transmit the output power from the first motor and the output power from the second motor to the driveshaft at preset speed ratios; a power demand setting module configured to set a power demand as a power required for the driveshaft; and a controller configured to control the first motor and the second motor so as to make a level of heat generation in the first motor substantially equivalent to a level of heat generation in the second motor and ensure output of a power equivalent to the set power demand to the driveshaft in a state that both of the first motor and the second motor are connected to the driveshaft by means of the speed change-transmission assembly.

In the power output apparatus according to this aspect of the invention, in the state of connection of both the first motor and the second motor with the driveshaft by means of the speed change-transmission assembly to output power to the driveshaft, the first motor and the second motor are controlled to make the level of heat generation in the first motor substantially equivalent to the level of heat generation in the second motor and to ensure output of a power, which is equivalent to a power demand or a power required for the driveshaft, to the driveshaft. In the state of connection of both the two motors with the driveshaft by means of the speed change-transmission assembly, the power output apparatus of this arrangement adequately controls the two motors to ensure continuous output of a relatively large torque while preventing excessive heat evolution in either of the first motor and the second motor. The level of heat generation in the first motor and the level of heat generation in the second motor may be defined with or without taking into account the process of cooling the first motor and the second motor.

In one preferable application of the power output apparatus according to the above aspect of the invention, the controller sets target powers, which are to be output from the first motor and from the second motor, based on the set power demand, in order to minimize a total of a loss of the first motor and a loss of the second motor. Setting the target powers to be output from the first motor and from the second motor in this manner allows the level of heat generation in the first motor to be substantially equivalent to the level of heat generation in the second motor.

In one preferable embodiment of the invention, the power output apparatus of the above aspect further has: an internal combustion engine; a power distribution integration mechanism configured to have a first element connecting with the rotating shaft of the first motor, a second element connecting with the rotating shaft of the second motor, and a third element connecting with an engine shaft of the internal combustion engine and arranged to allow mutually differential rotations of the three elements; and a connecting-disconnecting device configured to attain driving source element connection and release of the driving source element connection. The driving source element connection may be any one of connection of the first motor with the first element, connection of the second motor with the second element, and connection of the internal combustion engine with the third element. The driving source element connection may be released by the connecting-disconnecting device and operation of the internal combustion engine may be stopped when both the first motor and the second motor are connected to the driveshaft by the speed change-transmission assembly. The power output apparatus of this embodiment adequately changes over the driving state between a drive mode with output of the power to the driveshaft accompanied by operation of the internal combustion engine and a drive mode with transmission of the power from at least one of the first motor and the second motor to the driveshaft by means of the speed change-transmission assembly. This arrangement desirably improves the energy efficiency and the power transmission efficiency of the power output apparatus.

According to another aspect, the invention is also directed to a motor vehicle equipped with drive wheels driven with power from a driveshaft. The motor vehicle has: a first motor constructed to input and output power; a second motor constructed to input and output power; an accumulator arranged to transmit electric power to and from each of the first motor and the second motor; a speed change-transmission assembly configured to selectively connect either one or both of a rotating shaft of the first motor and a rotating shaft of the second motor to the driveshaft and transmit the output power from the first motor and the output power from the second motor to the driveshaft at preset speed ratios; a power demand setting module configured to set a power demand as a power required for the driveshaft; and a controller configured to control the first motor and the second motor so as to make a level of heat generation in the first motor substantially equivalent to a level of heat generation in the second motor and ensure output of a power equivalent to the set power demand to the driveshaft in a state that both of the first motor and the second motor are connected to the driveshaft by means of the speed change-transmission assembly.

The motor vehicle according to this aspect of the invention connects both the two motors to the driveshaft by means of the speed change-transmission assembly and thereby ensures continuous output of a relatively large torque. The motor vehicle of this arrangement accordingly has the improved hill climbing performance and the improved towing performance in a motor drive mode with these motors.

According to still another aspect, the invention is further directed to a control method of a power output apparatus. The power output apparatus has: a driveshaft; a first motor and a second motor respectively constructed to input and output power; an accumulator arranged to transmit electric power to and from each of the first motor and the second motor; and a speed change-transmission assembly configured to selectively connect either one or both of a rotating shaft of the first motor and a rotating shaft of the second motor to the driveshaft and transmit the output power from the first motor and the output power from the second motor to the driveshaft at preset speed ratios. The control method includes the steps of: (a) controlling the speed change-transmission assembly to connect both the first motor and the second motor to the driveshaft; and (b) controlling the first motor and the second motor to make a level of heat generation in the first motor substantially equivalent to a level of heat generation in the second motor and to ensure output of a power, which is equivalent to a power demand as a power required for the driveshaft, to the driveshaft.

In the state of connection of both the first motor and the second motor with the driveshaft by means of the speed change-transmission assembly to output power to the driveshaft, the control method of this arrangement adequately controls the two motors to ensure continuous output of a relatively large torque while preventing excessive heat evolution in either of the first motor and the second motor.

In one preferable application of the control method according to the above aspect of the invention, the step (b) sets target powers, which are to be output from the first motor and from the second motor, based on the power demand, in order to minimize a total of a loss of the first motor and a loss of the second motor.

In one preferable embodiment of the invention, the power output apparatus further has: an internal combustion engine; a power distribution integration mechanism configured to have a first element connecting with the rotating shaft of the first motor, a second element connecting with the rotating shaft of the second motor, and a third element connecting with an engine shaft of the internal combustion engine and arranged to allow mutually differential rotations of the three elements; and a connecting-disconnecting device configured to attain driving source element connection and release of the driving source element connection. The driving source element connection may be any one of connection of the first motor with the first element, connection of the second motor with the second element, and connection of the internal combustion engine with the third element. The step (a) releases the driving source element connection by the connecting-disconnecting device and stops operation of the internal combustion engine.

BEST MODES OF CARRYING OUT THE INVENTION

One mode of carrying out the invention is described below as a preferred embodiment.

Figure 1:
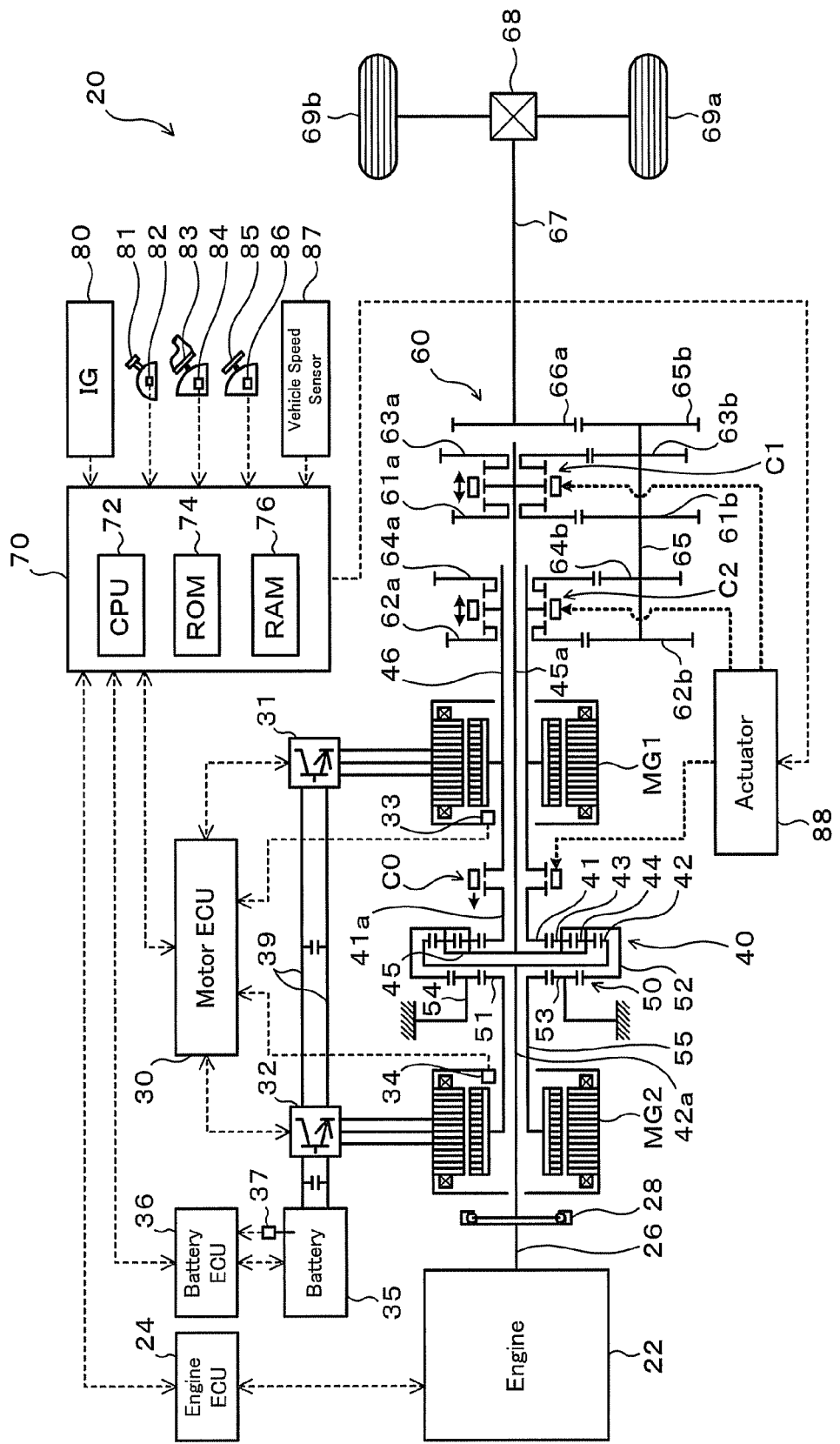
FIG. 1 schematically illustrates the configuration of a hybrid vehicle 20 in one embodiment of the invention.

FIG. 1 schematically illustrates the configuration of a hybrid vehicle 20 in one embodiment of the invention. The hybrid vehicle 20 shown in FIG. 1 is constructed as a rear-wheel drive vehicle and includes an engine 22 located in a front portion of the vehicle, a power distribution integration mechanism (differential rotation mechanism) 40 connected with a crankshaft 26 or an output of the engine 22, a motor MG1 connected with the power distribution integration mechanism 40 and designed to have power generation capability, a motor MG2 arranged coaxially with the motor MG1 to be connected with the power distribution integration mechanism 40 via a reduction gear mechanism 50 and designed to have power generation capability, a transmission 60 constructed to transmit the output power of the power distribution integration mechanism 40 with a speed change to a driveshaft 67, and a hybrid electronic control unit 70 (hereafter referred to as 'hybrid ECU') configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereafter referred to as engine ECU). The engine ECU 24 inputs diverse signals from various sensors provided for the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The motors MG1 and MG2 are constructed as synchronous motor generators having same specifications to enable operations as both a generator and a motor. The motors MG1 and MG2 are arranged to transmit electric power to and from a battery 35 or an accumulator via inverters 31 and 32. Power lines 39 connecting the battery 35 with the inverters 31 and 32 are structured as common positive bus and negative bus shared by the inverters 31 and 32. Such connection enables electric power generated by one of the motors MG1 and MG2 to be consumed by the other motor MG2 or MG1. The battery 35 may thus be charged with surplus electric power generated by either of the motors MG1 and MG2 and be discharged to supplement insufficient electric power. The battery 35 is neither charged nor discharged upon the balance of the input and output of electric powers between the motors MG1 and MG2. Both the motors MG1 and MG2 are driven and controlled by a motor electronic control unit 30 (hereafter referred to as motor ECU). The motor ECU 30 inputs various signals required for driving and controlling the motors MG1 and MG2, for example, signals representing rotational positions of rotors in the motors MG1 and MG2 from rotational position detection sensors 33 and 34 and signals representing phase currents to be applied to the motors MG1 and MG2 from current sensors (not shown). The motor ECU 30 outputs switching control signals to the inverters 31 and 32. The motor ECU 30 also computes rotation speeds Nm1 and Nm2 of the rotors in the motors MG1 and MG2 according to a rotation speed computation routine (not shown) based on the input signals from the rotational position detection sensors 33 and 34. The motor ECU 30 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 35 is under control and management of a battery electronic control unit 36 (hereafter referred to as battery ECU). The battery ECU 36 inputs signals required for management and control of the battery 35, for example, an inter-terminal voltage from a voltage sensor (not shown) located between terminals of the battery 35, a charge-discharge current from a current sensor (not shown) located in the power line 39 connecting with the output terminal of the battery 35, and a battery temperature Tb from a temperature sensor 37 attached to the battery 35. The battery ECU 36 outputs data regarding the operating conditions of the battery 35 by communication to the hybrid ECU 70 and to the engine ECU 24 according to the requirements. For the purpose of control and management of the battery 35, the battery ECU 36 also performs an arithmetic operation of calculating a remaining charge or state of charge SOC of the battery 35 from an integrated value of the charge-discharge current.

The power distribution integration mechanism 40 is located, together with the motors MG1 and MG2, the reduction gear mechanism 50, and the transmission 60, in a transmission casing (not shown) and is arranged coaxially with the crankshaft 26 across a predetermined distance from the engine 22. The power distribution integration mechanism 40 of this embodiment is constructed as a double-pinion planetary gear mechanism including a sun gear 41 as an external gear, a ring gear 42 as an internal gear arranged concentrically with the sun gear 41, and a carrier 45 arranged to hold at least one set of two pinion gears 43 and 44 in such a manner as to allow both their revolutions and their rotations on their axes. The two pinion gears 43 and 44 engage with each other and are arranged to respectively engage with the sun gear 41 and engage with the ring gear 42. The power distribution integration mechanism 40 has the sun gear 41 (second element), the ring gear 42 (third element), and the carrier 45 (first element) as elements of differential rotation. In this embodiment, the power distribution integration mechanism 40 is constructed to have a gear ratio $\rho$ (ratio of the number of teeth of the sun gear 41 to the number of teeth of the ring gear 42) satisfying a relation of $\rho<0.5$. The sun gear 41 as the second element of the power distribution integration mechanism 40 is connected with the motor MG1 (hollow rotor) or a second motor via a hollow sun gear shaft 41a extended from the sun gear 41 in an opposite direction to the engine 22 and a hollow first motor shaft 46 extended in the same direction (that is, toward a rear end of the vehicle). The carrier 45 as the first element is connected with the motor MG2 (hollow rotor) or a first motor via the reduction gear mechanism 50 located between the power distribution integration mechanism 40 and the engine 22 and a hollow second motor shaft 55 extended from the reduction gear mechanism 50 (a sun gear 51) toward the engine 22. The ring gear 42 as the third element is connected with the crankshaft 26 of the engine 22 via a ring gear shaft 42a extended to pass through the hollow second motor shaft 55 and the motor MG2 and a damper 28.

As shown in FIG. 1, a clutch C0 (connecting-disconnecting device) is provided between the sun gear shaft 41a and the first motor shaft 46 to make connection of the sun gear shaft 41a with the first motor shaft 46 (driving source element connection) and release of the connection. In the embodiment, the clutch C0 is structured, for example, as a dog clutch to make a dog element fastened to an end of the sun gear shaft 41a engage with a dog element fastened to an end of the first motor shaft 46 with lower loss and to release the engagement. The clutch C0 is actuated by an electric, electromagnetic, or hydraulic actuator 88. Releasing the clutch C0 disconnects the sun gear shaft 41a from the first motor shaft 46 and thereby separates the motor MG1 or the second motor from the sun gear 41 as the second element of the power distribution integration mechanism 40. The function of the power distribution integration mechanism 40 substantially separates the engine 22 from the motors MG1 and MG2 and the transmission 60. The first motor shaft 46 connectable with the sung gear 41 of the power distribution integration mechanism 40 by means of the clutch C0 is further extended from the motor MG1 in the opposite direction to the engine 22 (that is, toward the rear end of the vehicle) and is connected to the transmission 60. A carrier shaft (connecting shaft) 45a is extended from the carrier 45 of the power distribution integration mechanism 40 in the opposite direction to the engine 22 (that is, toward the rear end of the vehicle) to pass through the hollow sun gear shaft 41a and the hollow first motor shaft 46 and is also connected to the transmission 60. In the structure of the embodiment, the power distribution integration mechanism 40 is located between the coaxial motors MG1 and MG2 and is arranged coaxially with both the motors MG1 and MG2. The engine 22 is arranged coaxially with the motor MG2 and is located opposite to the transmission 60 across the power distribution integration mechanism 40. Namely the engine 22, the motors MG1 and MG2, the power distribution integration mechanism 40, and the transmission 60 as the constituents of the power output apparatus in the embodiment are arranged in the sequence of the engine 22, the motor MG2, (the reduction gear mechanism 50), the power distribution integration mechanism 40, the motor MG1, and the transmission 60 in a direction from the front end toward the rear end of the vehicle. This arrangement allows size reduction of the power output apparatus to be specifically suitable for being mounted on the hybrid vehicle 20 of the rear-wheel drive-based system.

The reduction gear mechanism 50 is constructed as a single-pinion planetary gear mechanism including a sun gear 51 as an external gear, a ring gear 52 as an internal gear arranged concentrically with the sun gear 51, multiple pinion gears 53 arranged to engage with both the sun gear 51 and the ring gear 52, and a carrier 54 arranged to hold the multiple pinion gears 53 in such a manner as to allow both their revolutions and their rotations on their axes. The sun gear 51 of the reduction gear mechanism 50 is connected to the rotor of the motor MG2 via the second motor shaft 55. The ring gear 52 of the reduction gear mechanism 50 is fixed to the carrier 45 of the power distribution integration mechanism 40, so that the reduction gear mechanism 50 is substantially integrated with the power distribution integration mechanism 40. The carrier 54 of the reduction gear mechanism 50 is fastened to the transmission casing. The function of the reduction gear mechanism 50 reduces the speed of the power from the motor MG2 and transmits the power of the reduced speed to the carrier 45 of the power distribution integration mechanism 40, while increasing the speed of the power from the carrier 45 and transmitting the power of the increased speed to the motor MG2. In the application of the power distribution integration mechanism 40 constructed as the double-pinion planetary gear mechanism to have the gear ratio $\rho$ of lower than the value 0.5, the carrier 45 has a higher torque distribution rate from the engine 22 than that of the sun gear 41. The arrangement of the reduction gear mechanism 50 between the carrier 45 of the power distribution integration mechanism 40 and the motor MG2 desirably attains size reduction of the motor MG2 and lowers the power loss of the motor MG2. In the structure of the embodiment, the reduction gear mechanism 50 is located between the motor MG2 and the power distribution integration mechanism 40 and is integrated with the power distribution integration mechanism 40. This arrangement allows the further size reduction of the power output apparatus. In this embodiment, the reduction gear mechanism 50 is constructed to have a speed reduction ratio (ratio of the number of teeth of the sun gear 51 to the number of teeth of the ring gear 52) close to $\rho/(1-\rho)$, where $\rho$ represents the gear ratio of the power distribution integration mechanism 40. This arrangement enables the motors MG1 and MG2 to have the same specification, thus improving the productivities of the power output apparatus and the hybrid vehicle 20 and attaining the cost reduction.

The transmission 60 is constructed as a parallel shaft-type automatic transmission having a speed change state (speed ratio) selectively changeable among multiple different values. The transmission 60 includes a first counter drive gear 61a and a first counter driven gear 61b constituting a first speed gear train, a second counter drive gear 62a and a second counter driven gear 62b constituting a second speed gear train, a third counter drive gear 63a and a third counter driven gear 63b constituting a third speed gear train, a fourth counter drive gear 64a and a fourth counter driven gear 64b constituting a fourth speed gear train, a countershaft 65 with the respective counter driven gears 61b through 64b and a gear 65b fixed thereon, clutches C1 and C2, a gear 66a attached to the driveshaft 67, and a reverse gear train (not shown). In the description below, the 'counter drive gears' and the 'counter driven gears' may be simply called 'gears'. In the transmission 60, the speed ratio has a largest value for the first speed gear train and decreases in the sequence of the second speed gear train, the third speed gear train, and the fourth speed gear train.

As shown in FIG. 1, the first gear 61a of the first speed gear train is fastened in a rotatable but axially unmovable manner on the carrier shaft 45a, which is extended from the carrier 45 as the first element of the power distribution integration mechanism 40, and continuously engages with the first gear 61b fixed on the countershaft 65. Similarly the third gear 63a of the third speed gear train is fastened in a rotatable but axially unmovable manner on the carrier shaft 45a and continuously engages with the third gear 61b fixed on the countershaft 65. In the structure of this embodiment, the clutch C1 is provided on the side of the carrier shaft 45a (on the side of the counter drive gears) to selectively fix one of the first gear 61a (first speed gear train) and the third gear 63a (third speed gear train) to the carrier shaft 45a and to release both the first gear 61a and the third gear 63a from the carrier shaft 45a and thereby make the first gear 61a and the third gear 63a rotatable relative to the carrier shaft 45a. The clutch C1 is structured, for example, as a dog clutch to make a dog element fastened on the carrier shaft 45a in a non-rotatable but axially movable manner engage with either one of a dog element fastened on the first gear 61a and a dog element fastened on the third gear 63a with lower loss and to release the engagement. The clutch C1 is actuated by the actuator 88. The gears 61a and 61b of the first speed gear train, the gears 63a and 63b of the third speed gear train, and the clutch C1 cooperatively work as a first speed change mechanism of the transmission 60. The second gear 62a of the second speed gear train is fastened in a rotatable but axially unmovable manner on the first motor shaft 46, which is connectable with the sun gear 41 as the second element of the power distribution integration mechanism 40 via the clutch C0, and continuously engages with the second gear 62b fixed on the countershaft 65. Similarly the fourth gear 64a of the fourth speed gear train is fastened in a rotatable but axially unmovable manner on the first motor shaft 46 and continuously engages with the fourth gear 64b fixed on the countershaft 65. In the structure of this embodiment, the clutch C2 is provided on the side of the first motor shaft 46 (on the side of the counter drive gears) to selectively fix one of the second gear 62a (second speed gear train) and the fourth gear 64a (fourth speed gear train) to the first motor shaft 46 and to release both the second gear 62a and the fourth gear 64a from the first motor shaft 46 and thereby make the second gear 62a and the fourth gear 64a rotatable relative to the first motor shaft 46. The clutch C2 is also structured, for example, as a dog clutch to make a dog element fastened on the first motor shaft 46 in a non-rotatable but axially movable manner engage with either one of a dog element fastened on the second gear 62a and a dog element fastened on the fourth gear 64a with lower loss and to release the engagement. The clutch C2 is also actuated by the actuator 88. The gears 62a and 62b of the second speed gear train, the gears 64a and 64b of the fourth speed gear train, and the clutch C2 cooperatively work as a second speed change mechanism of the transmission 60.

The power transmitted from either the carrier shaft 45a or the first motor shaft 46 to the countershaft 65 is transmitted to the driveshaft 67 via the gears 65b and 66a and is eventually output to rear wheels 69a and 69b as drive wheels via a differential gear 68. In the structure of the transmission 60 of the embodiment, the clutch C1 and the clutch C2 are respectively provided on the side of the carrier shaft 45a and on the side of the first motor shaft 46. This arrangement desirably reduces the potential loss in the fixation of the gears 61a to 64a to the carrier shaft 45a or to the first motor shaft 46 by means of the clutches C1 and C2. In the second speed change mechanism including the fourth speed gear train having an extremely small speed reduction ratio, the rotation speed of the gear 64a that idles prior to the fixation to the first motor shaft 46 by means of the clutch C2 becomes lower than the rotation speed of the mating gear 64b on the countershaft 65. Providing at least the clutch C2 on the side of the first motor shaft 46 allows the engagement of the dog element on the gear 64a with the dog element on the first motor shaft 46 with lower loss. The degree of such loss reduction partly depends upon the ratio of the numbers of teeth in the respective gear trains. In the first speed change mechanism including the first speed gear train having a large speed reduction ratio, the clutch C1 may be provided on the side of the countershaft 65.

In the transmission 60 having the construction discussed above, the fixation of either one of the first gear 61a (first speed gear train) and the third gear 63a (third speed gear train) to the carrier shaft 45a by means of the clutch C1, in combination with the release of the clutch C2, causes the power from the carrier shaft 45a to be transmitted to the driveshaft 67 via the first gear 61a (first speed gear train) or the third gear 63a (third speed gear train) and the countershaft 65. The fixation of either one of the second gear 62a (second speed gear train) and the fourth gear 64a (fourth speed gear train) to the first motor shaft 46 by means of the clutch C2, in combination with the coupling of the clutch C0 and the release of the clutch C1, causes the power from the first motor shaft 46 to be transmitted to the driveshaft 67 via the second gear 62a (second speed gear train) or the fourth gear 64a (fourth speed gear train) and the countershaft 65. In the description hereafter, the state of power transmission by the first speed gear train, the state of power transmission by the second speed gear train, the state of power transmission by the third speed gear train, and the state of power transmission by the fourth speed gear train are respectively referred to as 'first speed state ($1^{st}$ speed)', 'second speed state ($2^{nd}$ speed)', 'third speed state ($3^{rd}$ speed)', and 'fourth speed state ($4^{th}$ speed). In the structure of the transmission 60 of the embodiment, the clutch C1 and the clutch C2 are respectively provided on the side of the carrier shaft 45a and on the side of the first motor shaft 46. This arrangement desirably reduces the potential loss in the fixation of the gears 61a to 64a to the carrier shaft 45a or to the first motor shaft 46 by means of the clutches C1 and C2. In the second speed change mechanism including the fourth speed gear train having an extremely small speed reduction ratio, the rotation speed of the gear 64a that idles prior to the fixation to the first motor shaft 46 by means of the clutch C2 becomes lower than the rotation speed of the mating gear 64b on the countershaft 65. Providing at least the clutch C2 on the side of the first motor shaft 46 allows the engagement of the dog element on the gear 64a with the dog element on the first motor shaft 46 with lower loss. The degree of such loss reduction partly depends upon the ratio of the numbers of teeth in the respective gear trains. In the first speed change mechanism including the first speed gear train having a large speed reduction ratio, the clutch C1 may be provided on the side of the countershaft 65.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 87. The hybrid ECU 70 makes connection with the engine ECU 24, the motor ECU 30, and the battery ECU 36 via its communication port to transmit various control signals and data to and from the engine ECU 24, the motor ECU 30, and the battery ECU 36 as mentioned previously. The actuator 88 actuating the clutch C0 and the clutches C1 and C2 of the transmission 60 is also under control of the hybrid ECU 70.

The series of operations of the hybrid vehicle 20 constructed as discussed above are explained with reference to FIGS. 2 through 8. In the charts of FIGS. 2 through 8, an S-axis represents a rotation speed of the sun gear 41 in the power distribution integration mechanism 40 (equivalent to a rotation speed Nm1 of the motor MG1 or the first motor shaft 46). An R-axis represents a rotation speed of the ring gear 42 in the power distribution integration mechanism 40 (equivalent to a rotation speed Ne of the engine 22). A C-axis represents a rotation speed of the carrier 45 in the power distribution integration mechanism 40 (equivalent to a rotation speed of the carrier shaft 45a and a rotation speed of the ring gear 52 in the reduction gear mechanism 50). A 61a-axis to a 64a-axis, a 65-axis, and a 67-axis respectively represent rotation speeds of the first gear 64a to the fourth gear 64a in the transmission 60, a rotation speed of the countershaft 65, and a rotation speed of the driveshaft 67.

Figure 2:
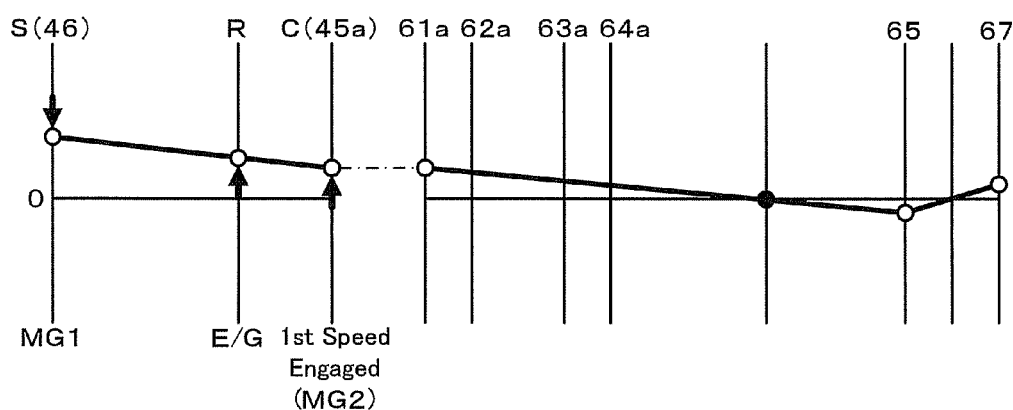
FIG. 2 is an explanatory view showing torque-rotation speed dynamics of primary elements in a power distribution integration mechanism 40 and in a transmission 60 in the case of changing a speed change state of the transmission 60 in response to a variation in vehicle speed in a drive mode of the hybrid vehicle 20 of the embodiment with operation of the engine 22.
Figure 3:
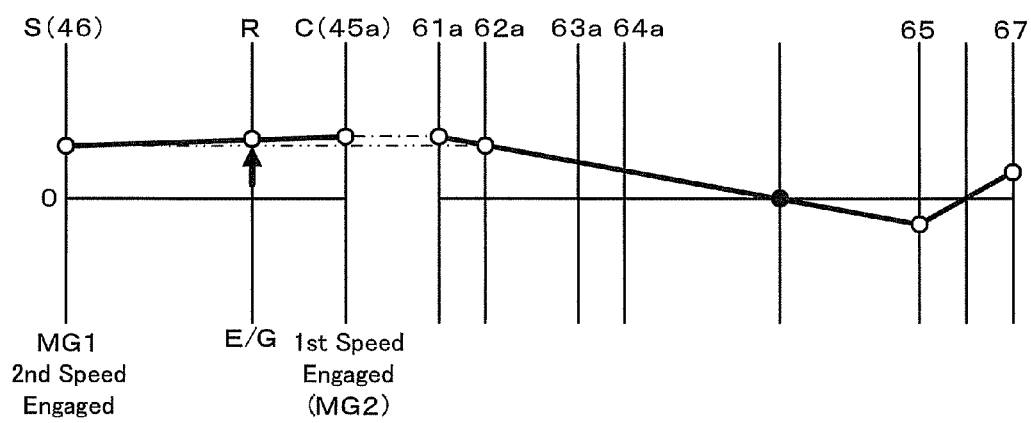
FIG. 3 is an explanatory view similar to FIG. 2.
Figure 4:
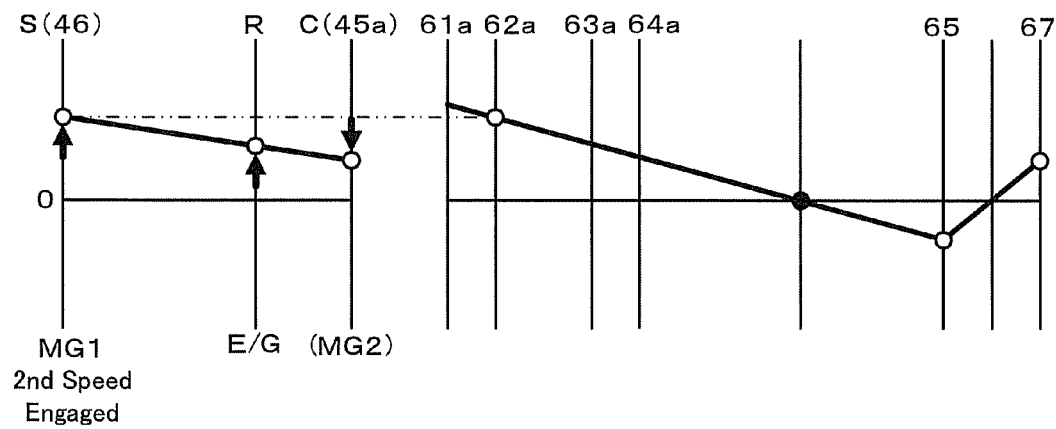
FIG. 4 is an explanatory view similar to FIG. 2.
Figure 5:
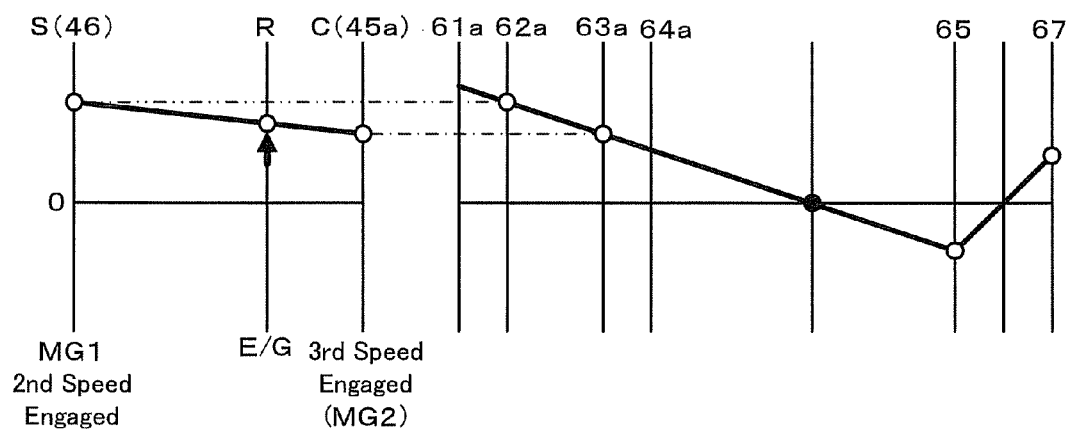
FIG. 5 is an explanatory view similar to FIG. 2.
Figure 6:
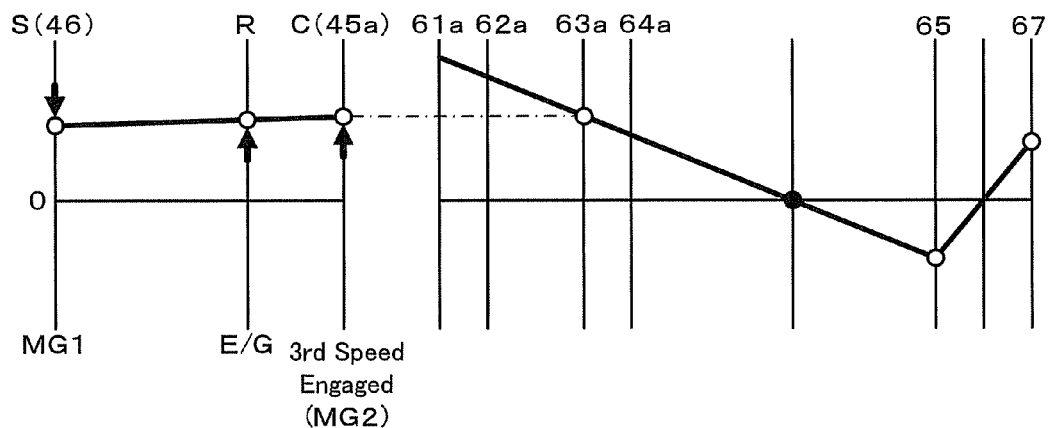
FIG. 6 is an explanatory view similar to FIG. 2.
Figure 7:
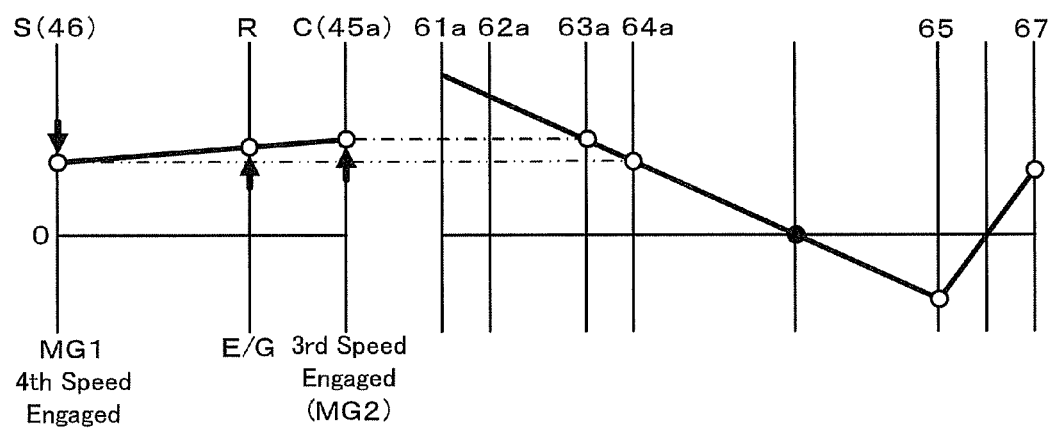
FIG. 7 is an explanatory view similar to FIG. 2.
Figure 8:
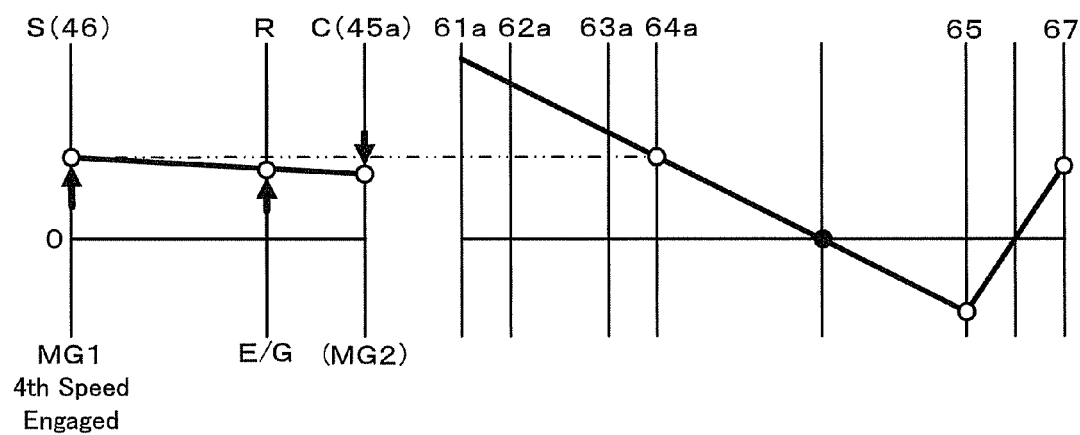
FIG. 8 is an explanatory view similar to FIG. 2.

During drive of the hybrid vehicle 20 with the operation of the engine 22 in the state of engagement of the clutch C0, the fixation of the first gear 61a (first speed gear train) to the carrier shaft 45a by means of the clutch C1, in combination with the release of the clutch C2, causes the power from the carrier shaft 45a to be subjected to speed change (speed reduction) according to the speed ratio of the first gear train (the first gears 61a and 61b) and to be output to the driveshaft 67 as shown in FIG. 2. In the first speed state with the fixation of the first gear 61a (first speed gear train) to the carrier shaft 45a by means of the clutch C1, in response to a variation of the vehicle speed V, the fixation of the second gear 62a (second speed gear train) to the first motor shaft 46 by means of the clutch C2, in combination with setting 0 to torque commands of both the motors MG1 and MG2, causes the power (torque) output from the engine 22 to be mechanically (directly) transmitted to the driveshaft 67 at a fixed (constant) speed ratio (a value between the speed ratio of the first speed gear train and the speed ratio of the second speed gear train) without conversion into electrical energy as shown in FIG. 3. In the description hereafter, the state of coupling the carrier 45 as the first element of the power distribution integration mechanism 40 to the driveshaft 67 by means of the first speed gear train of the transmission 60 and coupling the sun gear 41 as the second element of the power distribution integration mechanism 40 to the driveshaft 67 by means of the second speed gear train of the transmission 60 (that is, the state of FIG. 3) is referred to as '$1^{st}$ speed-$2^{nd}$ speed simultaneous engagement state'. In the $1^{st}$ speed-$2^{nd}$ speed simultaneous engagement state of FIG. 3, the release of the clutch C1 leads to the fixation of only the second gear 62a (second speed gear train) to the first motor shaft 46 (the sun gear 41) by means of the clutch C2 as shown by a two-dot chain line in FIG. 4. Such fixation causes the power from the first motor shaft 46 to be subjected to speed change according to the speed ratio of the second speed gear train (the second gears 62a and 62b) and to be output to the driveshaft 67. In the second speed state with the fixation of the second gear 62a (second speed gear train) to the first motor shaft 46 by means of the clutch C2, in response to a variation of the vehicle speed V, the fixation of the third gear 63a (third speed gear train) to the carrier shaft 45a by means of the clutch C1, in combination with setting 0 to torque commands of both the motors MG1 and MG2, causes the power (torque) output from the engine 22 to be mechanically (directly) transmitted to the driveshaft 67 at a fixed (constant) speed ratio (a value between the speed ratio of the second speed gear train and the speed ratio of the third speed gear train), which is different from the fixed speed ratio in the $1^{st}$ speed-$2^{nd}$ speed simultaneous engagement state, without conversion into electrical energy as shown in FIG. 5. In the description hereafter, the state of coupling the sun gear 41 as the second element of the power distribution integration mechanism 40 to the driveshaft 67 by means of the second speed gear train of the transmission 60 and coupling the carrier 45 as the first element of the power distribution integration mechanism 40 to the driveshaft 67 by means of the third speed gear train of the transmission 60 (that is, the state of FIG. 5) is referred to as '$2^{nd}$ speed-$3^{rd}$ speed simultaneous engagement state'. In the $2^{nd}$ speed-$3^{rd}$ speed simultaneous engagement state of FIG. 5, the release of the clutch C2 leads to the fixation of only the third gear 63a (third speed gear train) to the carrier shaft 45a (the carrier 45) by means of the clutch C1 as shown by a one-dot chain line in FIG. 6. Such fixation causes the power from the carrier shaft 45a to be subjected to speed change according to the speed ratio of the third speed gear train (the third gears 63a and 63b) and to be output to the driveshaft 67. In the third speed state with the fixation of the third gear 63a (third speed gear train) to the carrier shaft 45a by means of the clutch C1, in response to a variation of the vehicle speed V, the fixation of the fourth gear 64a (fourth speed gear train) to the first motor shaft 46 by means of the clutch C2, in combination with setting 0 to torque commands of both the motors MG1 and MG2, causes the power (torque) output from the engine 22 to be mechanically (directly) transmitted to the driveshaft 67 at a fixed (constant) speed ratio (a value between the speed ratio of the third speed gear train and the speed ratio of the fourth speed gear train), which is different from the fixed speed ratios in the $1^{st}$ speed-$2^{nd}$ speed simultaneous engagement state and in the $2^{nd}$ speed-$3^{rd}$ speed simultaneous engagement state, without conversion into electrical energy as shown in FIG. 7. In the description hereafter, the state of coupling the carrier 45 as the first element of the power distribution integration mechanism 40 to the driveshaft 67 by means of the third speed gear train of the transmission 60 and coupling the sun gear 41 as the second element of the power distribution integration mechanism 40 to the driveshaft 67 by means of the fourth speed gear train of the transmission 60 (that is, the state of FIG. 7) is referred to as '$3^{rd}$ speed-$4^{th}$ speed simultaneous engagement state'. In the $3^{rd}$ speed-$4^{th}$ speed simultaneous engagement state of FIG. 7, the release of the clutch C1 leads to the fixation of only the fourth gear 64a (fourth speed gear train) to the first motor shaft 46 (the sun gear 41) by means of the clutch C2 as shown by a two-dot chain line in FIG. 8. Such fixation causes the power from the first motor shaft 46 to be subjected to speed change according to the speed ratio of the fourth speed gear train (the fourth gears 64a and 64b) and to be output to the driveshaft 67.

Figure 9:
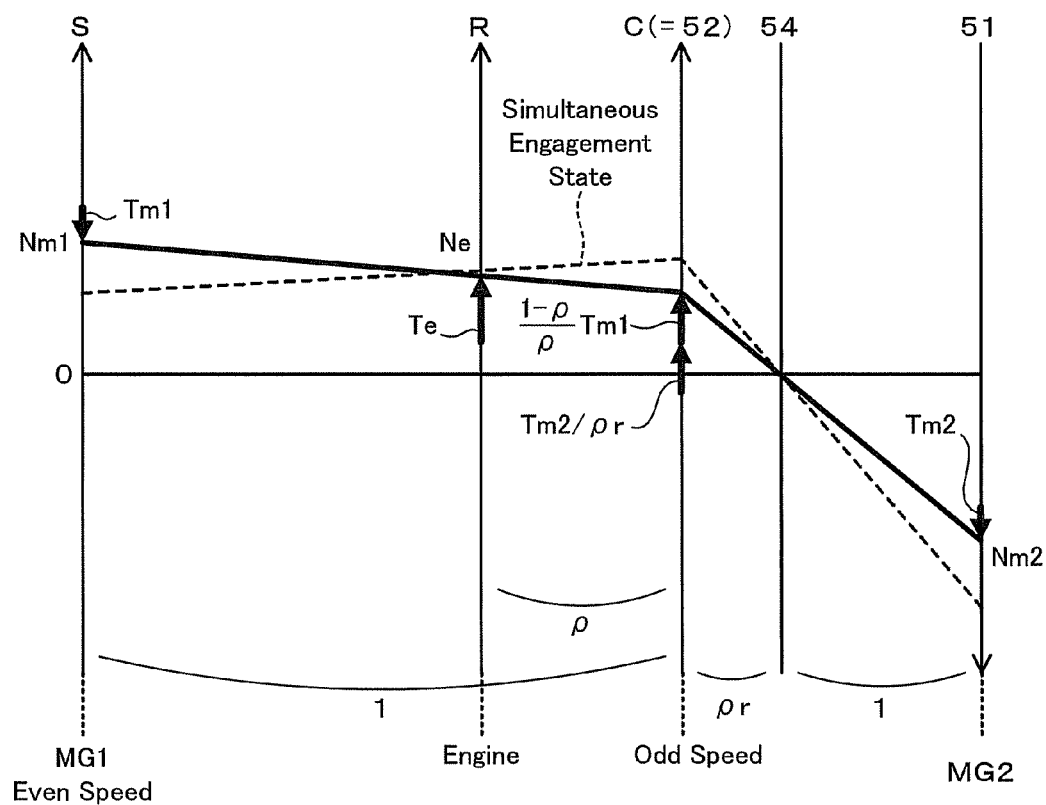
FIG. 9 is an alignment chart showing torque-rotation speed dynamics of the respective elements in the power distribution integration mechanism 40 and in a reduction gear mechanism 50 in a state of making a motor MG1 function as a generator and a motor MG2 function as a motor.

As discussed above, during drive of the hybrid vehicle 20 with the operation of the engine 22, in response to setting the transmission 60 in either the first speed state or the third speed state, the motors MG1 and MG2 are driven and controlled to set the carrier 45 of the power distribution integration mechanism 40 to the output element and make the motor MG2 connecting with the carrier 45 function as a motor and to make the motor MG1 connecting with the sun gear 41 set to the reaction force element function as a generator. In this state, the power distribution integration mechanism 40 distributes the power of the engine 22 input via the ring gear 42 into the sun gear 41 and the carrier 45 according to its gear ratio ρ, while integrating the power of the engine 22 with the power of the motor MG2 functioning as the motor and outputting the integrated power to the carrier 45. In the description hereafter, the mode of making the motor MG1 function as the generator and the motor MG2 function as the motor is referred to as 'first torque conversion mode'. In the first torque conversion mode, the power from the engine 22 is subjected to torque conversion by means of the power distribution integration mechanism 40 and the motors MG1 and MG2 and is output to the carrier 45. Controlling the rotation speed of the motor MG1 enables the ratio of the rotation speed Ne of the engine 22 to the rotation speed of the carrier 45 as the output element to be varied in a stepless and continuous manner. FIG. 9 is an alignment chart showing torque-rotation speed dynamics of the respective elements in the power distribution integration mechanism 40 and in the reduction gear mechanism 50 in the first torque conversion mode. In the alignment chart of FIG. 9, an S-axis, an R-axis, and a C-axis represent the same as those in the charts of FIGS. 2 through 8. A 54-axis represents a rotation speed of the carrier 54 in the reduction gear mechanism 50. A 51-axis represents a rotation speed of the sun gear 51 in the reduction gear mechanism 50 (equivalent to a rotation speed Nm2 of the motor MG2 or the second motor shaft 55). In FIG. 9, ρ and ρr respectively denote a gear ratio of the power distribution integration mechanism 40 (ratio of the number of teeth of the sun gear 41 to the number of teeth of the ring gear 42) and a gear ratio of the reduction gear mechanism 50 (ratio of the number of teeth of the sun gear 51 to the number of teeth of the ring gear 52). Thick arrows on the respective axes show torques applied to the corresponding elements. In the alignment chart of FIG. 9, the rotation speeds on the S-axis, the R-axis, and the C-axis have positive values above a 0-axis (horizontal axis) and negative values below the 0-axis. On the S-axis, the R-axis, and the C-axis, the upward arrows show torques of positive values, while the downward arrows show torques of negative values. The rotation speed on the 51-axis, on the other hand, has a positive value below the 0-axis (horizontal axis) and a negative value above the 0-axis. On the 51-axis, the downward arrow shows a torque of a positive value, while the upward arrow shows a torque of a negative value. In the alignment chart of FIG. 9, each symbol representing either the rotation speed or the torque is a scalar value (this is also applied to FIGS. 2 through 8, as well as FIG. 10 and FIG. 11 discussed later).

Figure 10:
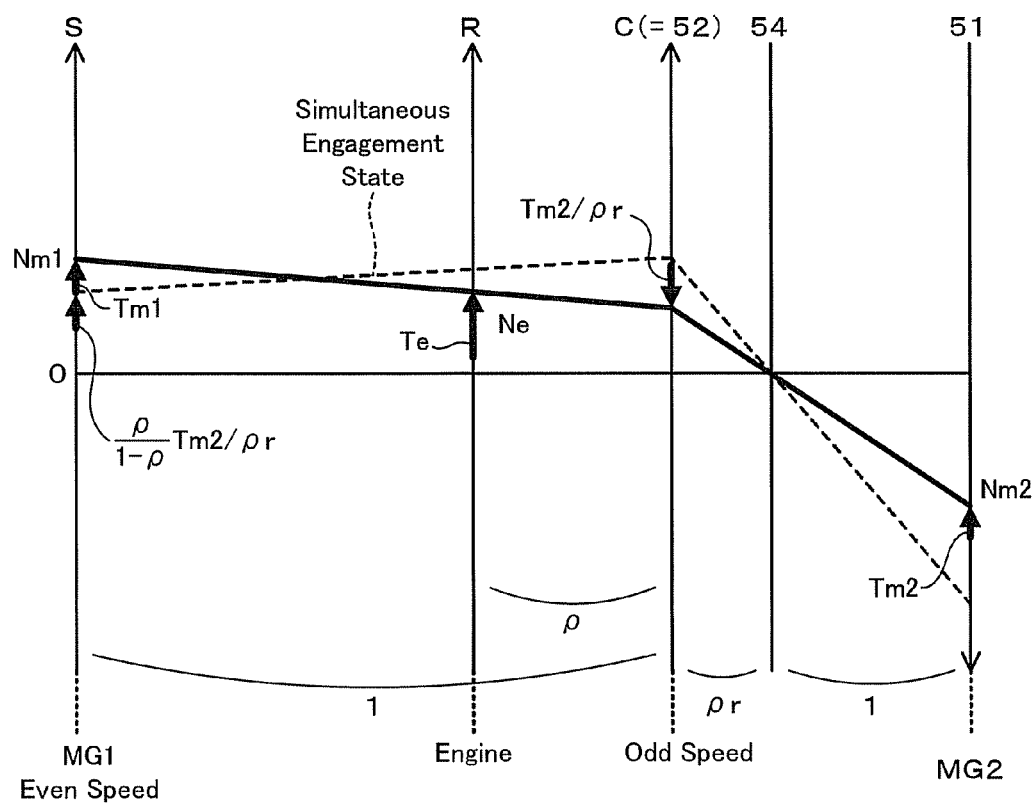
FIG. 10 is an alignment chart showing torque-rotation speed dynamics of the respective elements in the power distribution integration mechanism 40 and in the reduction gear mechanism 50 in a state of making the motor MG2 function as a generator and the motor MG1 function as a motor.

During drive of the hybrid vehicle 20 with the operation of the engine 22, in response to setting the transmission 60 in either the second speed state or the fourth speed state, the motors MG1 and MG2 are driven and controlled to set the sun gear 41 of the power distribution integration mechanism 40 to the output element and make the motor MG1 connecting with the sun gear 41 function as a motor and to make the motor MG2 connecting with the carrier 45 set to the reaction force element function as a generator. In this state, the power distribution integration mechanism 40 distributes the power of the engine 22 input via the ring gear 42 into the sun gear 41 and the carrier 45 according to its gear ratio ρ, while integrating the power of the engine 22 with the power of the motor MG1 functioning as the motor and outputting the integrated power to the sun gear 41. In the description hereafter, the mode of making the motor MG2 function as the generator and the motor MG1 function as the motor is referred to as 'second torque conversion mode'. In the second torque conversion mode, the power from the engine 22 is subjected to torque conversion by means of the power distribution integration mechanism 40 and the motors MG1 and MG2 and is output to the sun gear 41. Controlling the rotation speed of the motor MG2 enables the ratio of the rotation speed Ne of the engine 22 to the rotation speed of the carrier 41 as the output element to be varied in a stepless and continuous manner. FIG. 10 is an alignment chart showing torque-rotation speed dynamics of the respective elements in the power distribution integration mechanism 40 and in the reduction gear mechanism 50 in the second torque conversion mode.

As described above, in the hybrid vehicle 20 of the embodiment, the torque conversion mode is alternately changed over between the first torque conversion mode and the second torque conversion mode with a change of the speed ratio (speed change state) of the transmission 60. Such alternate change of the torque conversion mode desirably prevents the rotation speed Nm1 or Nm2 of one motor MG1 or MG2 functioning as a generator from decreasing to a negative value with an increase of the rotation speed Nm2 or Nm1 of the other motor MG2 or MG1 functioning as a motor. The configuration of the hybrid vehicle 20 thus effectively prevents the occurrence of power circulation in the first torque conversion mode as well as the occurrence of power circulation in the second torque conversion mode, thus improving the power transmission efficiency in a wider driving range. The power circulation in the first torque conversion mode is that, in response to a decrease of the rotation speed of the motor MG1 to a negative value, the motor MG2 consumes part of the power output to the carrier shaft 45a to generate electric power, while the motor MG1 consumes the electric power generated by the motor MG2 to output power. The power circulation in the second torque conversion mode is that, in response to a decrease of the rotation speed of the motor MG2 to a negative value, the motor MG1 consumes part of the power output to the first motor shaft 46 to generate electric power, while the motor MG2 consumes the electric power generated by the motor MG1 to output power. Prevention of such power circulation restricts the maximum rotation speeds of the motors MG1 and MG2 and thus desirably allows size reduction of the motors MG1 and MG2. In the hybrid vehicle 20 of the embodiment, the power from the engine 22 is mechanically (directly) transmittable to the driveshaft 67 at the respective fixed speed ratios intrinsic to the $1^{st}$ speed-$2^{nd}$ speed simultaneous engagement state, the $2^{nd}$ speed-$3^{rd}$ speed simultaneous engagement state, and the $3^{rd}$ speed-$4^{th}$ speed simultaneous engagement state as explained previously. This arrangement desirably increases the opportunity of mechanically outputting the power from the engine 22 to the driveshaft 67 without conversion into electrical energy, thus further improving the power transmission efficiency in the wider driving range. In general, in the power output apparatus having the engine, the two motors, and the differential rotation mechanism, such as the planetary gear mechanism, there is a greater fraction of conversion of the engine output power into electrical energy at a relatively large speed reduction ratio between the engine and the driveshaft. This lowers the power transmission efficiency and tends to cause heat evolution from the motors MG1 and MG2. The simultaneous engagement modes discussed above are thus especially advantageous for the relatively large speed reduction ratio between the engine 22 and the driveshaft. In the hybrid vehicle 20 of the embodiment, the torque conversion mode is changed over between the first torque conversion mode and the second torque conversion mode via the simultaneous engagement mode at the time of a change of the speed change state in the transmission 60. This arrangement effectively prevents a torque-off condition at the time of a change of the speed ratio and ensures a smooth and shockless change of the speed ratio, that is, a smooth and shockless changeover of the torque conversion mode between the first torque conversion mode and the second torque conversion mode.

Figure 11:
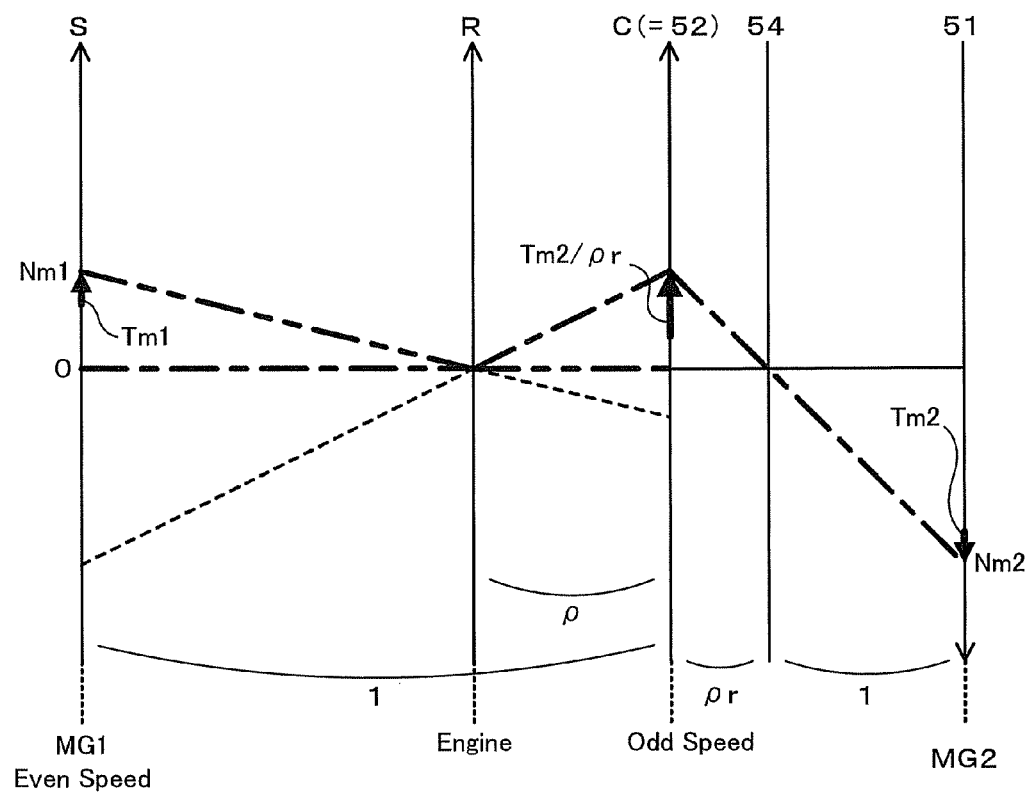
FIG. 11 is an explanatory view for describing a motor drive mode in the hybrid vehicle 20 of the embodiment.

The following describes the outline of the motor drive mode, where the engine 22 stops its operation and at least one of the motors MG1 and MG2 consumes the electric power supplied from the battery 35 and outputs the driving power to drive the hybrid vehicle 20, with reference to FIG. 11 and other relevant drawings. The motor drive mode of the hybrid vehicle 20 of the embodiment has three different modes, a clutch-engaged 1-motor drive mode of causing one of the motors MG1 and MG2 to output the driving power in the engaged state of the clutch C0, a clutch-released 1-motor drive mode of causing one of the motors MG1 and MG2 to output the driving power in the released state of the clutch C0, and a 2-motor drive mode of using the driving power output from both the motors MG1 and MG2 in the released state of the clutch C0.

In the clutch-engaged 1-motor drive mode with engagement of the clutch C0, the fixation of either the first gear 61a of the first speed gear train or the third gear 63a of the third speed gear train to the carrier shaft 45a by means of the clutch C1 in combination with the release of the clutch C2 of the transmission 60 causes only the motor MG2 to output the driving power. Alternatively the fixation of either the second gear 62a of the second speed gear train or the fourth gear 64a of the fourth speed gear train to the first motor shaft 46 by means of the clutch C2 in combination with the release of the clutch C1 of the transmission 60 causes only the motor MG1 to output the driving power. In this clutch-engaged 1-motor drive mode, the engagement of the clutch C0 connects the sun gear 41 of the power distribution integration mechanism 40 with the first motor shaft 46. Such connection causes one motor MG1 or MG2 that does not output the driving power to be followed up and idled by the other motor MG2 or MG1 that outputs the driving power (as shown by a broken line in FIG. 11). In the clutch-released 1-motor drive mode with release of the clutch C0, the fixation of either the first gear 61a of the first speed gear train or the third gear 63a of the third speed gear train to the carrier shaft 45a by means of the clutch C1 in combination with the release of the clutch C2 of the transmission 60 causes only the motor MG2 to output the driving power. Alternatively the fixation of either the second gear 62a of the second speed gear train or the fourth gear 64a of the fourth speed gear train to the first motor shaft 46 by means of the clutch C2 in combination with the release of the clutch C1 of the transmission 60 causes only the motor MG1 to output the driving power. In this clutch-released 1-motor drive mode, the release of the clutch C0 disconnects the sun gear 41 from the first motor shaft 46. Such disconnection prevents the follow-up of the crankshaft 26 of the engine 22 at stop by the function of the power distribution integration mechanism 40, while preventing the follow-up of the motor MG1 or MG2 at stop by the release of the clutch C2 or C1 as shown by a one-dot chain line and a two-dot chain line in FIG. 11. This arrangement desirably prevents a decrease of the power transmission efficiency. In the 2-motor drive mode with release of the clutch C0, at least one of the motors MG1 and MG2 is driven and controlled after setting the transmission 60 in one of the $1^{st}$ speed-$2^{nd}$ speed simultaneous engagement state, the $2^{nd}$ speed-$3^{rd}$ speed simultaneous engagement state, and the $3^{rd}$ speed-$4^{th}$ speed simultaneous engagement state by the functions of the clutches C1 and C2. Such drive control enables both the motors MG1 and MG2 to output the driving power, while effectively preventing the follow-up of the engine 22. This arrangement allows transmission of large power to the driveshaft 67 in the motor drive mode, thus ensuring a good hill start and the favorable towing performance in the motor drive mode.

In selection of the clutch-released 1-motor drive mode, the hybrid vehicle 20 of the embodiment is capable of readily changing the speed ratio (speed change state) of the transmission 60 to ensure efficient transmission of the power to the driveshaft 67. For example, in the clutch-released 1-motor drive mode with the output of power from only the motor MG2 by the fixation of the first gear 61a of the first speed gear train or the third gear 63a of the third speed gear train to the carrier shaft 45a by means of the clutch C1 of the transmission 60, the fixation of either the second gear 62a or the fourth gear 64a to the first motor shaft 46 by means of the clutch C2 in combination with synchronization of the rotation speed of the motor MG1 at stop with the rotation speed of the second gear 62a of the second speed gear train or with the rotation speed of the fourth gear 64a of the fourth speed gear train allows a shift to the 2-motor drive mode, that is, one of the $1^{st}$ speed-$2^{nd}$ speed simultaneous engagement state, the $2^{nd}$ speed-$3^{rd}$ speed simultaneous engagement state, and the $3^{rd}$ speed-$4^{th}$ speed simultaneous engagement state. In this state, the output of power from only the motor MG1 in combination with release of the clutch C1 of the transmission 60 causes the output power of the motor MG1 to be transmitted to the driveshaft 67 via either the second speed gear train or the fourth speed gear train of the transmission 60. In the hybrid vehicle 20 of the embodiment, the transmission 60 is used to change the rotation speed of the carrier shaft 45a or of the first motor shaft 46 and amplify the torque in the motor drive mode. This arrangement desirably lowers the maximum torques required for the motors MG1 and MG2 and thus ensures size reduction of the motors MG1 and MG2. In the process of a change of the speed ratio of the transmission 60 in the motor drive mode, the hybrid vehicle 20 of the embodiment transits the simultaneous engagement state of the transmission 60, that is, the 2-motor drive mode. This arrangement effectively prevents a torque-off condition at the time of a change of the speed ratio and ensures a smooth and shockless change of the speed ratio. In the motor drive mode, in response to an increase in driving force demand or in response to a decrease in state of charge SOC of the battery 35, the hybrid vehicle 20 of the embodiment controls one motor MG1 or MG2 that does not output the driving power to crank the engine 22 according to the speed ratio of the transmission 60 and thereby starts the engine 22.

Figure 12:
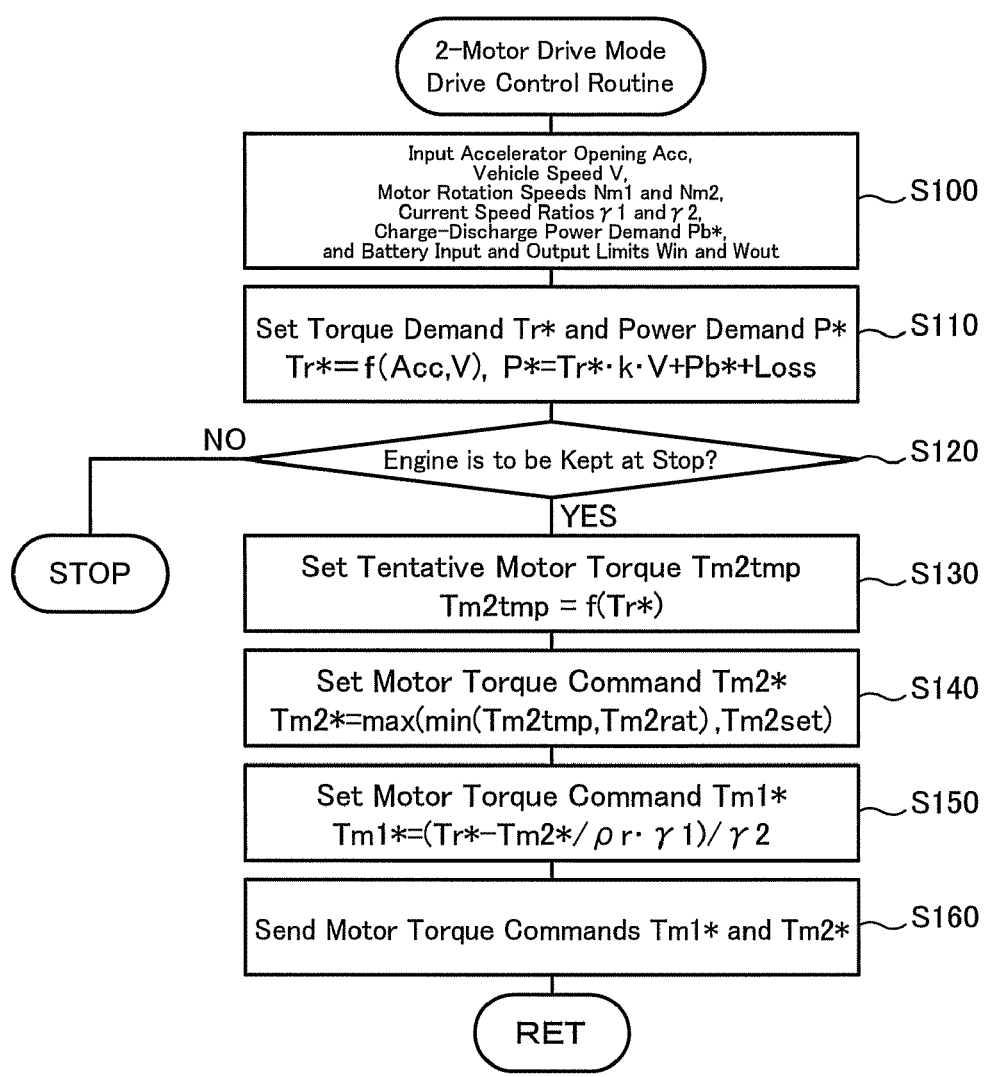
FIG. 12 is a flowchart showing a 2-motor drive-time drive control routine executed by a hybrid ECU 70 in response to selection of a 2-motor drive mode in the hybrid vehicle 20 of the embodiment.

A control procedure of driving the hybrid vehicle 20 in the 2-motor drive mode using the driving power from both the motors MG1 and MG2 with release of the clutch C0 is discussed concretely with reference to FIG. 12. FIG. 12 is a flowchart showing a 2-motor drive-time drive control routine executed by the hybrid ECU 70 in response to selection of the 2-motor drive mode. This routine is triggered by setting the transmission 60 in one of the $1^{st}$ speed-$2^{nd}$ speed simultaneous engagement state, the $2^{nd}$ speed-$3^{rd}$ speed simultaneous engagement state, and the $3^{rd}$ speed-$4^{th}$ speed simultaneous engagement state discussed above in combination with release of the clutch C0 and is performed repeatedly at preset time intervals (for example, at every several msec). The 2-motor drive mode is selected, for example, in the event of a start of the hybrid vehicle 20 on an uphill road (hill start) or in the event of a start of the hybrid vehicle 20 connected with some traction object.

At the start of the 2-motor drive-time drive control routine, the CPU 72 of the hybrid ECU 70 inputs various data required for control, for example, the accelerator opening Acc from the accelerator pedal position sensor 84, the vehicle speed V from the vehicle speed sensor 87, the rotation speeds Nm1 and Nm2 of the motors MG1 and MG2, current speed ratios γ1 and γ2 of the first and the second speed change mechanisms in the transmission 60, a charge-discharge power demand Pb*, and input and output limits Win and Wout of the battery 35 (step S100). The rotation speeds Nm1 and Nm2 of the motors MG1 and MG2 are input from the motor ECU 40 by communication. The current speed ratio γ1 represents the speed ratio of either the first speed gear train or the third speed gear train in the first speed change mechanism of the transmission 60, which is activated to connect the carrier shaft 45a to the driveshaft 67 in the 2-motor drive mode. The current speed ratio γ2 represents the speed ratio of either the second speed gear train or the fourth speed gear train in the second speed change mechanism of the transmission 60, which is activated to connect the first motor shaft 46 to the driveshaft 67 in the 2-motor drive mode. The current speed ratio γ1 or the current speed ratio γ2 is stored in a specific area of the RAM 76 on completion of connection of the carrier shaft 45a or the first motor shaft 46 to the driveshaft 67. The charge-discharge power demand Pb* represents an electric power to be charged into or discharged from the battery 35. The charge-discharge power demand Pb* is set according to the state of charge SOC of the battery 35 by the battery ECU 36 and is input from the battery ECU 36 by communication. The input limit Win and the output limit Wout respectively represent an allowable charging electric power to be charged into the battery 35 and an allowable discharging electric power to be discharged from the battery 35. The input limit Win and the output limit Wout are set based on the battery temperature Tb of the battery 35 measured by the temperature sensor 37 and the state of charge SOC of the battery 35 and are input from the battery ECU 36 by communication. A concrete procedure of setting the input limit Win and the output limit Wout of the battery 35 sets base values of the input limit Win and the output limit Wout corresponding to the battery temperature Tb, sets an input limit correction coefficient and an output limit correction coefficient according to the state of charge (SOC) of the battery 35, and multiplies the base values of the input limit Win and the output limit Wout by the corresponding correction coefficients.

Figure 13:
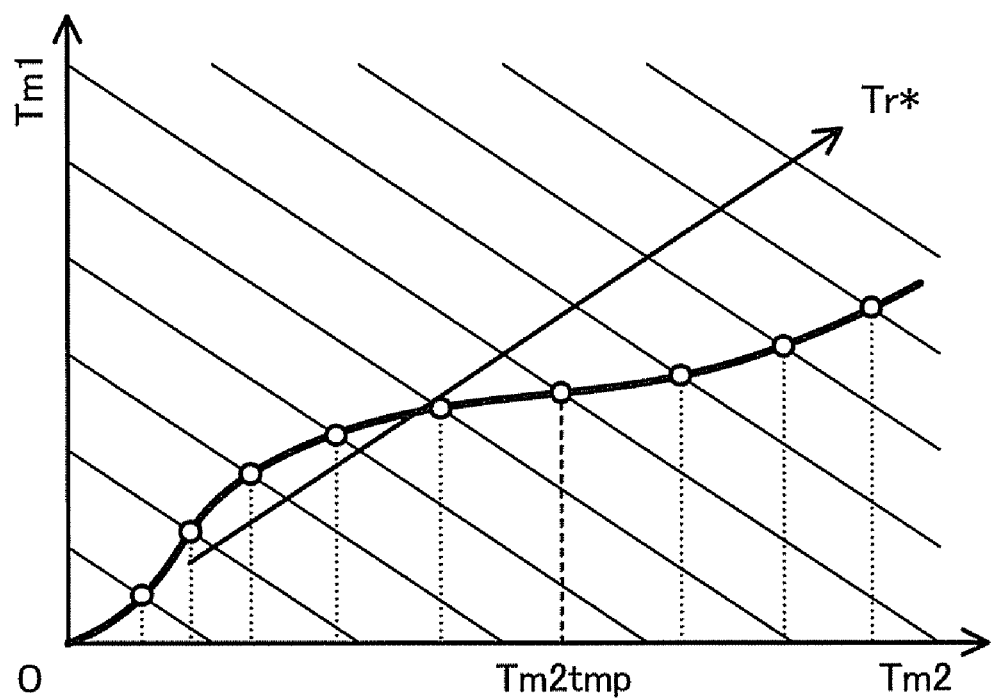
FIG. 13 shows one example of a tentative motor torque setting map.

After the data input at step S100, the CPU 72 sets a torque demand Tr* to be output to the driveshaft 67 and a power demand P* required for the whole hybrid vehicle 20, based on the input accelerator opening Acc and the input vehicle speed V (step S110). A concrete procedure of setting the torque demand Tr* in the embodiment provides and stores in advance variations in torque demand Tr* against the vehicle speed V with regard to various settings of the accelerator opening Acc as a torque demand setting map (not shown) in the ROM 74 and reads the torque demand Tr* corresponding to the given accelerator opening Acc and the given vehicle speed V from this torque demand setting map. The power demand P* is obtained as the sum of the product of the torque demand Tr* set at step S110 and the vehicle speed V, which reflects the rotation speed of the driveshaft 67 and is multiplied by a conversion factor k, the charge-discharge power demand Pb* (where positive values represent charge demands), and a potential loss. It is then determined whether the engine 22 is to be kept at stop, based on the power demand P* set at step S110 and the output limit Wout (or the state of charge SOC) input at step S100 (step S120). Upon determination at step S120 that the engine 22 is to be kept at stop, a tentative motor torque Tm2$tmp$ is determined as a torque to be output from the motor MG2, based on the torque demand Tr* set at step S110 (step S130). In this embodiment, a tentative motor torque setting map as shown in FIG. 13 is provided in advance and is stored in the ROM 74. The tentative motor torque setting map specifies torques Tm1 and Tm2 of the motors MG1 and MG2 that give a substantially minimum total loss (copper loss) of the motors MG1 and MG2 having the substantially identical specifications with respect to each value of the torque demand Tr*. At step S130, the torque Tm2 corresponding to the torque demand Tr* set at step S110 is read from the tentative motor torque setting map and is set as the tentative motor torque Tm2$tmp$ of the motor MG2. The tentative motor torque setting map is created through experiments and analyses by taking into account the speed ratios of the first speed change mechanism and the second speed change mechanism in the transmission 60 and the speed reduction ratio pr of the reduction gear mechanism 50. A torque command Tm2* of the motor MG2 is then set by restricting the tentative motor torque Tm2$tmp$ with a maximum rated torque Tm2$rat$ and a preset minimum output torque Tm2$set$ of the motor MG2 (where Tm2$set$<Tm2$rat$) (step S140). A torque command Tm1* of the motor MG1 is subsequently computed from the torque demand Tr*, the torque command Tm2* of the motor MG2, the current speed ratios γ1 and γ2, and the speed reduction ratio pr of the reduction gear mechanism 50 according to Equation (1) given below (step S150):

$$Tm1^* = (Tr^* - Tm2^*/\rho r \cdot \gamma 1)/\gamma 2 \quad (1)$$

Equation (1) is readily obtainable from the alignment chart of FIG. 11 and is used to determine a torque share of the motor MG1 relative to the torque demand Tr* when the motor MG2 outputs a torque equivalent to the torque command Tm2*. After setting the torque commands Tm1* and Tm2* of the motors MG1 and MG2, the CPU 72 sends the settings of the torque commands Tm1* and Tm2* to the motor ECU 40 (step S160) and repeats the processing of and after step S100. The motor ECU 40 receives the torque commands Tm1* and Tm2* and performs switching control of switching elements included in the inverters 31 and 32 to drive the motors MG1 and MG2 with the respective torque commands Tm1* and Tm2*.

Upon determination at step S120 that the engine 22 is to be started, on the other hand, the 2-motor drive-time drive control routine is terminated immediately. A torque shift routine (not shown) is then performed to enable the engine 22 to be cranked by one of the motors MG1 and MG2. The torque shift routine shifts the power from one of the motors MG1 and MG2 that does not respond to a target speed ratio of the transmission 60 to the other of the motors MG1 and MG2. On completion of such torque shift, a rotation speed synchronization routine (not shown) is performed to release the connection of the motor MG1 or MG2 that does not respond to the target speed ratio of the transmission 60 with the driveshaft 67 and to couple the clutch C0. The rotation speed synchronization routine synchronizes the rotation speed Nm1 or Nm2 of the motor MG1 or MG2 disconnected from the driveshaft 67 with the rotation speed of the sun gear 41 or of the carrier 45 in the driving source element connection state based on the rotation speed Nm2 or Nm1 of the motor MG2 or MG1 connected with the driveshaft 67. After the coupling of the clutch C0, an engine start-time drive control routine (not shown) is activated to crank and start the engine 22 with one of the motors MG1 and MG2.

As described above, during drive in the 2-motor drive mode with connection of both the motors MG1 and MG2 with the driveshaft 67 by means of the transmission 60, the hybrid vehicle 20 of the embodiment sets the torque commands Tm1* and Tm2* of the motors MG1 and MG2 based on the torque demand Tr* set at step S110, in order to minimize the sum of the loss (copper loss) of the motor MG1 and the loss (copper loss) of the motor MG2 and to ensure output of a power equivalent to the torque demand Tr* to the driveshaft 67 (steps S130 to S150). Such setting enables the level of heat generation in the motor MG1 to be basically equivalent to the level of heat generation in the motor MG2, unless the motors MG1 and MG2 have significantly different cooling capacities in a cooling system (not shown). In the hybrid vehicle 20 of the embodiment, adequate control of the two motors MG1 and MG2 ensures continuous output of a relatively large torque, while preventing excessive heat evolution in any of the motors MG1 and MG2 and the corresponding inverters 31 and 32. In the power output apparatus of the embodiment including the engine 22, the motors MG1 and MG2, the power distribution integration mechanism 40, and the transmission 60, the driving state is adequately changed over between the drive mode with output of the driving power to the driveshaft 67 accompanied by operation of the engine 22 and the drive mode with transmission of the driving power from at least one of the motors MG1 and MG2 to the driveshaft 67 by means of the transmission 60. This arrangement desirably improves the energy efficiency and the power transmission efficiency. The 2-motor drive-time drive control routine of FIG. 12 is also applicable to an electric vehicle with omission of the engine 22 and the power distribution integration mechanism 40 from the structure of the power output apparatus. As explained above, the power output apparatus mounted on the hybrid vehicle 20 of the embodiment is capable of connecting both the two motors MG1 and MG2 to the driveshaft 67 by means of the transmission 60 to ensure continuous output of a relatively large torque. The hybrid vehicle 20 of this configuration accordingly has the improved hill climbing performance and the towing performance in the motor drive mode with the motors MG1 and MG2.

As described above, the transmission 60 of the embodiment is the parallel shaft-type transmission constructed to have the first speed change mechanism including the first speed gear train and the third speed gear train as the parallel shaft-type gear trains for connecting the carrier 45 or the first element of the power distribution integration mechanism 40 to the driveshaft 67 and the second speed change mechanism including the second speed gear train and the fourth speed gear train as the parallel shaft-type gear trains for connecting the first motor shaft 46 of the motor MG1 to the driveshaft 67. The transmission 60 accordingly works to selectively connect one or both of the first motor shaft 46 of the motor MG1 and the carrier 45 (the motor MG2) to the driveshaft 67. The hybrid vehicle 20 of the embodiment may adopt a planetary gear-type transmission, in place of the parallel shaft-type transmission 60.

Figure 14:
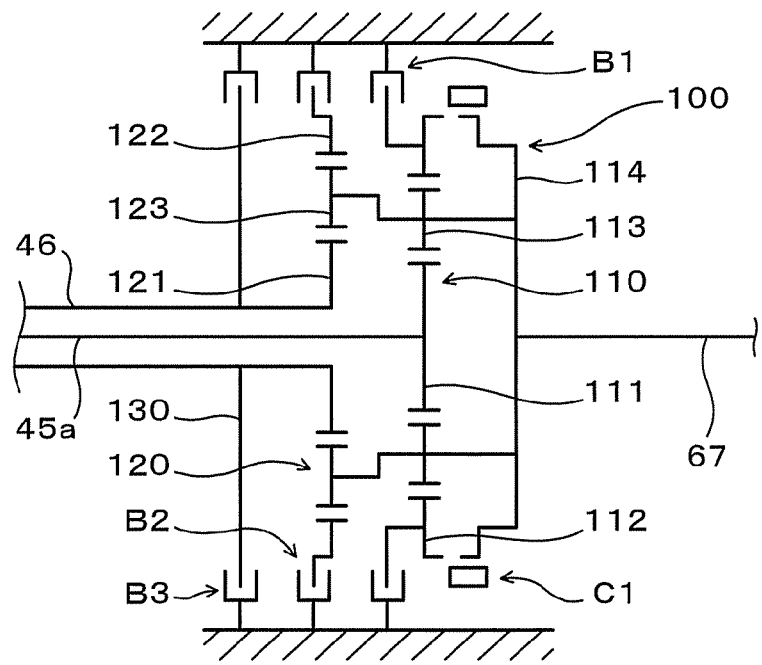
FIG. 14 shows the schematic structure of another transmission 100 applicable to the hybrid vehicle 20 of the embodiment.

FIG. 14 shows the schematic structure of one planetary gear-type transmission 100 applicable to the hybrid vehicle 20 of the embodiment. The transmission 100 shown in FIG. 14 is designed to have a speed ratio (speed change state) selectively changeable among multiple different values. The transmission 100 includes a first change-speed planetary gear mechanism 110, a second change-speed planetary gear mechanism 120, a brake B1 (first fixation mechanism) provided for the first change-speed planetary gear mechanism 110, a brake B2 (second fixation mechanism) provided for the second change-speed planetary gear mechanism 120, a brake B3 (rotation fixation mechanism), and a clutch C1 (change-speed connecting disconnecting mechanism). The first change-speed planetary gear mechanism 110 is arranged to connect the carrier 45 (the carrier shaft 45a) or the first element of the power distribution integration mechanism 40 to the driveshaft 67. The second change-speed planetary gear mechanism 120 is arranged to connect the first motor shaft 46 of the motor MG1 to the driveshaft 67. The first change-speed planetary gear mechanism 110 and the brake B1 constitute a first speed change mechanism of the transmission 100, and the second change-speed planetary gear mechanism 120 and the brake B2 constitute a second speed change mechanism of the transmission 100. As shown in FIG. 14, the first change-speed planetary gear mechanism 110 is constructed as a single-pinion planetary gear mechanism including a sun gear 111 (input element) connected with the carrier shaft 45a, a ring gear 112 (fixable element) as an internal gear arranged concentrically with the sun gear 111, and a carrier 114 (output element) arranged to hold multiple pinion gears 113 engaging with both the sun gear 111 and the ring gear 112 and connected to the driveshaft 67. The second change-speed planetary gear mechanism 120 is constructed as a single-pinion planetary gear mechanism including a sun gear 121 (input element) connected with the first motor shaft 46, a ring gear 122 (fixable element) as an internal gear arranged concentrically with the sun gear 121, and the common carrier 114 (output element) shared by the first change-speed planetary gear mechanism 110 and arranged to hold multiple pinion gears 123 engaging with both the sun gear 121 and the ring gear 122. In the structure of FIG. 14, the second change-speed planetary gear mechanism 120 is arranged coaxially with and located ahead of the first change-speed planetary gear mechanism 110 in the vehicle body. The second change-speed planetary gear mechanism 120 has a gear ratio $\rho 2$ (ratio of the number of teeth of the sun gear 121 to the number of teeth of the ring gear 122), which is slightly greater than a gear ratio $\rho 1$ (ratio of the number of teeth of the sun gear 111 to the number of teeth of the ring gear 112) of the first change-speed planetary gear mechanism 110.

The brake B1 fixes the ring gear 112 of the first change-speed planetary gear mechanism 110 to a transmission casing to prohibit the rotation of the ring gear 112, while releasing the fixation of the ring gear 112 to allow the rotation of the ring gear 112. The brake B1 is actuated by an electric, electromagnetic, or hydraulic actuator (not shown). The brake B2 fixes the ring gear 122 of the second change-speed planetary gear mechanism 120 to the transmission casing to prohibit the rotation of the ring gear 122, while releasing the fixation of the ring gear 122 to allow the rotation of the ring gear 122. The brake B2 is also actuated by the electric, electromagnetic, or hydraulic actuator (not shown). The brake B3 fixes the first motor shaft 46 or the sun gear 41 as the second element of the power distribution integration mechanism 40 to the transmission casing via a stator 130 fixed to the first motor shaft 46 to prohibit the rotation of the first motor shaft 46, while releasing the fixation of the stator 130 to allow the rotation of the first motor shaft 46. The brake B3 is also actuated by the electric, electromagnetic, or hydraulic actuator (not shown). The clutch C1 connects and disconnects the carrier 114 as the output element with and from the ring gear 112 as the fixable element of the first change-speed planetary gear mechanism 110. The clutch C1 is also actuated by the electric, electromagnetic, or hydraulic actuator (not shown). The transmission 100 of this configuration significantly reduces the dimensions both in the axial direction and in the radial direction, compared with the parallel shaft-type transmission. The first change-speed planetary gear mechanism 110 and the second change-speed planetary gear mechanism 120 are located in the downstream of and are arranged coaxially with the engine 22, the motors MG1 and MG2, and the power distribution integration mechanism 40. The transmission 100 of this arrangement desirably simplifies the bearing structure and reduces the total number of required bearings.

The transmission 100 of this configuration has the speed change state selectively changeable among the multiple different states as discussed below. The non-rotatable fixation of the ring gear 112 of the first change-speed planetary gear mechanism 110 to the transmission casing by means of the brake B1 causes the power from the carrier shaft 45a to be subjected to speed change at a speed ratio of $(\rho 1/(1+\rho 1))$ based on the gear ratio $\rho 1$ of the first change-speed planetary gear mechanism 110 and to be transmitted to the driveshaft 67 (hereafter this state is referred to as 'first speed state ($1^{st}$ speed)'). The non-rotatable fixation of the ring gear 122 of the second change-speed planetary gear mechanism 120 to the transmission casing by means of the brake B2 causes the power from the first motor shaft 46 to be subjected to speed change at a speed ratio of $(\rho 2/(1+\rho 2))$ based on the gear ratio $\rho 2$ of the second change-speed planetary gear mechanism 120 and to be transmitted to the driveshaft 67 (hereafter this state is referred to as 'second speed state ($2^{nd}$ speed)'). The connection of the carrier 114 with the ring gear 112 in the first change-speed planetary gear mechanism 110 by means of the clutch C1 substantially locks and integrally rotates the sun gear 111, the ring gear 112, and the carrier 114 as the constituents of the first change-speed planetary gear mechanism 110 and thereby causes the power from the carrier shaft 45a to be transmitted to the driveshaft 67 at a speed ratio of 1 (hereafter this state is referred to as 'third speed state ($3^{rd}$ speed)'. In the first speed state, the fixation of the ring gear 122 by the brake B2 of the second speed change mechanism connects both the carrier shaft 45a and the first motor shaft 46 to the driveshaft 67 and causes the output power from the engine 22 or the output power from at least one of the motors MG1 and MG2 to be mechanically (directly) transmitted to the driveshaft 67 at a fixed speed ratio (hereafter this state is referred to as '$1^{st}$ speed-$2^{nd}$ speed simultaneous engagement state'). In the second speed state, the connection of the carrier 114 with the ring gear 112 in the first change-speed planetary gear mechanism 110 by means of the clutch C1 also connects both the carrier shaft 45a and the first motor shaft 46 to the driveshaft 67 and causes the output power from the engine 22 or the output power from at least one of the motors MG1 and MG2 to be mechanically (directly) transmitted to the driveshaft 67 at a fixed speed ratio that is different from the fixed speed ratio in the $1^{st}$ speed-$2^{nd}$ speed simultaneous engagement state discussed above (this state is hereafter referred to as '$2^{nd}$ speed-$3^{rd}$ speed simultaneous engagement state'). In the third speed state, the non-rotatable fixation of the first motor shaft 46 or the sun gear 41 as the second element of the power distribution integration mechanism 40 to the transmission casing via the stator 130 fastened to the first motor shaft 46 by means of the brake B3 causes the output power from the engine 22 or the output power from the motor MG2 to be mechanically (directly) transmitted to the driveshaft 67 at a fixed speed ratio that is different from the fixed speed ratios in the $1^{st}$ speed-$2^{nd}$ speed simultaneous engagement state and in the $2^{nd}$ speed-$3^{rd}$ speed simultaneous engagement state (this state is hereafter referred to as '$3^{rd}$ speed fixation state'). The planetary gear-type transmission 100 has the similar functions and effects to those of the parallel shaft-type transmission 60 discussed previously.

Figure 15:
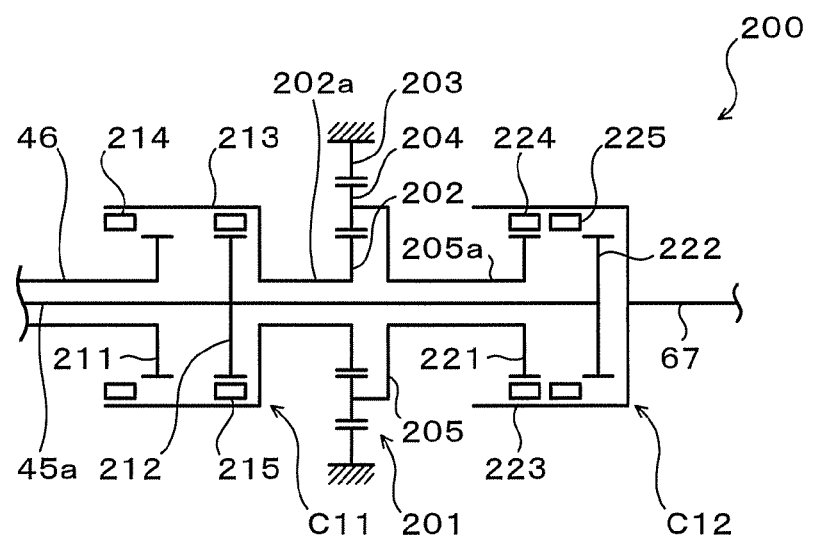
FIG. 15 shows the schematic structure of still another transmission 200 applicable to the hybrid vehicle 20 of the embodiment.

FIG. 15 shows the schematic structure of another planetary gear-type transmission 200 applicable to the hybrid vehicle 20 of the embodiment. The transmission 200 shown in FIG. 14 is also designed to have a speed ratio (speed change state) selectively changeable among multiple different values and includes a speed-change differential rotation mechanism (speed reduction device) 201 and clutches C11 and C12. The speed-change differential rotation mechanism 201 is constructed as a single-pinion planetary gear mechanism including a sun gear 202 as an input element, a ring gear 203 as a fixation element fastened to a transmission casing in a non-rotatable manner and arranged concentrically with the sun gear 202, and a carrier 205 as an output element arranged to hold multiple pinion gears 204 engaging with both the sun gear 202 and the ring gear 203. The clutch C11 includes a first engagement element 211 provided on an end of the first motor shaft 46, a second engagement element 212 provided on the carrier shaft 45a, a third engagement element 213 provided on a hollow sun gear shaft 202a connected with the sun gear 202 of the speed-change differential rotation mechanism 201, a first movable engagement member 214 arranged to be movable in an axial direction along the first motor shaft 46 and the carrier shaft 45a and configured to engage with both the first engagement element 211 and the third engagement element 213, and a second movable engagement member 215 arranged to be movable in the axial direction and configured to engage with both the second engagement element 212 and the third engagement element 213. The first movable engagement member 214 and the second movable engagement member 215 are respectively actuated by an electric, electromagnetic, or hydraulic actuator (not shown). Adequate operations of the first movable engagement member 214 and the second movable engagement member 215 enable either one or both of the first motor shaft 46 and the carrier shaft 45a to be selectively connected with the sun gear 202 of the speed-change differential rotation mechanism 201. The clutch C12 includes a first engagement element 221 provided on an end of a hollow carrier shaft 205a, which is connected with the carrier 205 or the output element of the speed-change differential rotation mechanism 201 and is extended toward the rear end of the vehicle body, a second engagement element 222 provided on the carrier shaft 45a extended through the sun gear shaft 202a and the carrier shaft 205a, a third engagement element 223 provided on the driveshaft 67, a first movable engagement member 224 arranged to be movable in the axial direction along the first motor shaft 46 and the carrier shaft 45a and arranged to engage with both the first engagement element 221 and the third engagement element 223, and a second movable engagement member 225 arranged to be movable in the axial direction and configured to engage with both the second engagement element 222 and the third engagement element 223. The first movable engagement member 224 and the second movable engagement member 225 are respectively actuated by the electric, electromagnetic, or hydraulic actuator (not shown). Adequate operations of the first movable engagement member 224 and the second movable engagement member 225 enable either one or both of the carrier shaft 205a and the carrier shaft 45a to be selectively connected to the driveshaft 67.

The transmission 200 of this configuration has the speed change state selectively changeable among the multiple different states as discussed below. The connection of the carrier shaft 45a with the sun gear 202 of the speed-change differential rotation mechanism 201 by means of the clutch C11, in combination with the connection of the carrier shaft 205a to the driveshaft 67 by means of the clutch C12, causes the power from the carrier shaft 45a to be subjected to speed change at a specific speed ratio based on a gear ratio of the speed-change differential rotation mechanism 201 and to be transmitted to the driveshaft 67 (hereafter this state is referred to as 'first speed state ($1^{st}$ speed)'). The connection of the first motor shaft 46 with the sun gear 202 of the speed-change differential rotation mechanism 201 by means of the clutch C11, in combination with the connection of the carrier shaft 205a to the driveshaft 67 by means of the clutch C12, causes the power from the first motor shaft 46 to be subjected to speed change at the specific speed ratio based on the gear ratio of the speed-change differential rotation mechanism 201 and to be transmitted to the driveshaft 67 (hereafter this state is referred to as 'second speed state ($2^{nd}$ speed)'). The release of the clutch C11 for disconnecting both the carrier shaft 45a and the first motor shaft 46 from the sun gear shaft 202a, in combination with the connection of the carrier shaft 45a to the driveshaft 67 by means of the clutch C12, causes the power from the carrier shaft 45a to be transmitted to the driveshaft 67 at a speed ratio of 1 (hereafter this state is referred to as 'third speed state ($3^{rd}$ speed)'). In the structure of the transmission 200, in the first speed state, the connection of both the carrier shaft 45a and the first motor shaft 46 to the driveshaft 67 by means of the clutch C11, in combination with the connection of the carrier shaft 205a to the driveshaft 67 by means of the clutch C12, causes the output power from the engine 22 or the output power from at least one of the motors MG1 and MG2 to be mechanically (directly) transmitted to the driveshaft 67 at a fixed speed ratio (hereafter this state is referred to as '$1^{st}$ speed-$2^{nd}$ speed simultaneous engagement state'). In the second speed state, the connection of both the carrier shaft 45a and the first motor shaft 46 to the driveshaft 67 by means of the clutch C11, in combination with the connection of the carrier shaft 45a to the driveshaft 67 by means of the clutch C12, causes the output power from the engine 22 or the output power from at least one of the motors MG1 and MG2 to be mechanically (directly) transmitted to the driveshaft 67 at a fixed speed ratio that is different from the fixed speed ratio in the $1^{st}$ speed-$2^{nd}$ speed simultaneous engagement state discussed above (this state is hereafter referred to as '$2^{nd}$ speed-$3^{rd}$ speed simultaneous engagement state'). In the third speed state, the non-rotatable fixation of the first motor shaft 46 or the sun gear 41 as the second element of the power distribution integration mechanism 40 to the transmission casing by means of a brake (not shown)

causes the output power from the engine 22 or the output power from the motor MG2 to be mechanically (directly) transmitted to the driveshaft 67 at a fixed speed ratio that is different from the fixed speed ratios in the $1^{st}$ speed-$2^{nd}$ speed simultaneous engagement state and in the $2^{nd}$ speed-$3^{rd}$ speed simultaneous engagement state (this state is hereafter referred to as '$3^{rd}$ speed fixation state'). The planetary gear-type transmission 200 also has the similar functions and effects to those of the parallel shaft-type transmission 60 discussed previously.

Figure 16:
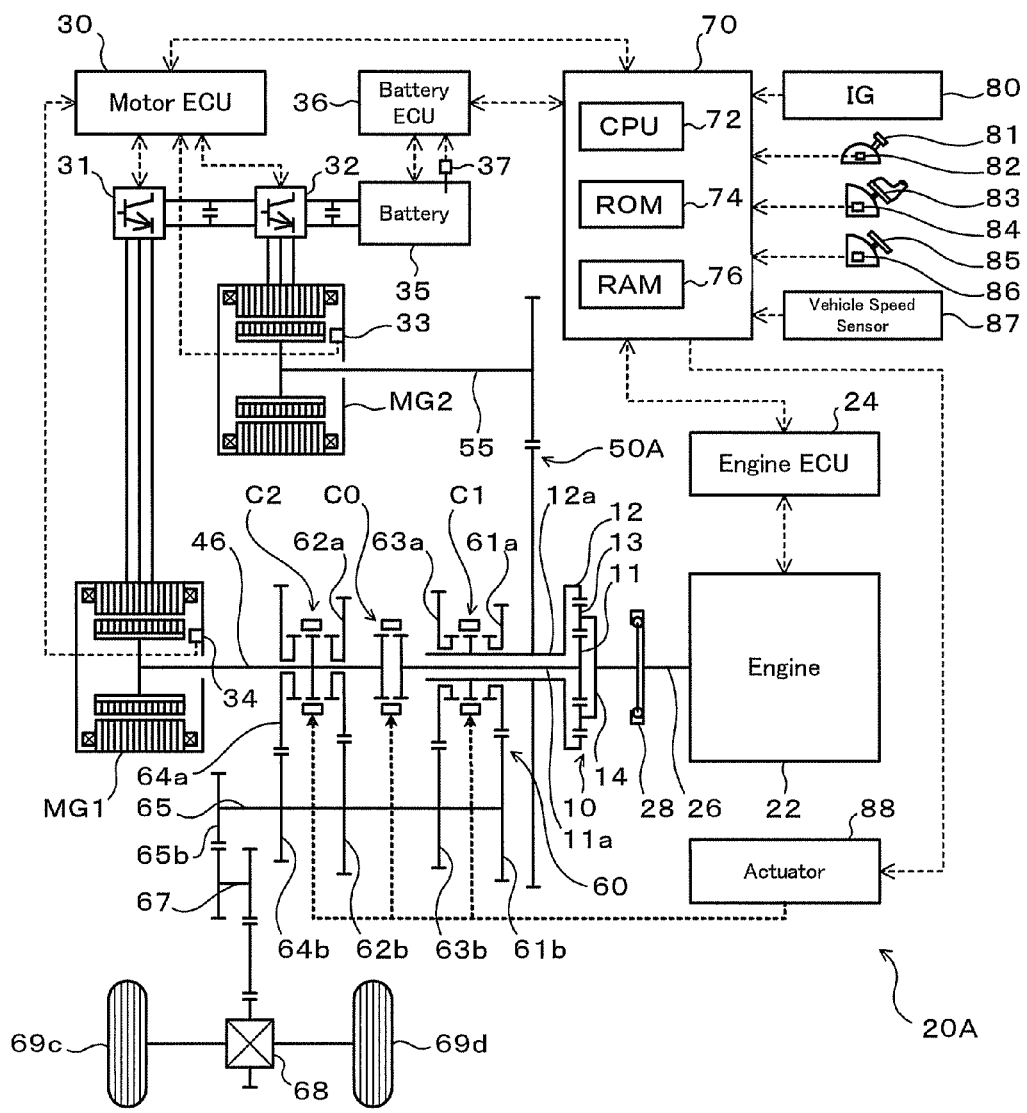
FIG. 16 schematically illustrates the configuration of a hybrid vehicle 20A of a modified example.

FIG. 16 schematically illustrates the configuration of a hybrid vehicle 20A as one modified example of the embodiment. While the hybrid vehicle 20 of the embodiment is configured as a rear wheel-drive vehicle, the hybrid vehicle 20A of the modified example is configured as a front wheel-drive vehicle. As shown in FIG. 16, the hybrid vehicle 20A has a power distribution integration mechanism 10 constructed as a single-pinion planetary gear mechanism including a sun gear 11, a ring gear 12 arranged concentrically with the sun gear 11, and a carrier 14 arranged to hold multiple pinion gears 13 engaging with both the sun gear 11 and the ring gear 12. The engine 22 is horizontally arranged, and the crankshaft 26 of the engine 22 is connected with the carrier 14 as a third element of the power distribution integration mechanism 10. The ring gear 12 as a first element of the power distribution integration mechanism 10 is connected with a hollow ring gear shaft 12a, which is connected to the motor MG2 via a reduction gear mechanism 50A constructed as a parallel shaft-type gear train and the second motor shaft 55 extended in parallel with the first motor shaft 46. Either the first speed gear train (gear 61a) or the third speed gear train (gear 63a) in the first speed change mechanism of the transmission 60 is selectively fixed to the ring gear shaft 12a by means of the clutch C1. The sun gear 11 as a second element of the power distribution integration mechanism 10 is connected with a sun gear shaft 11a. The sun gear shaft 11a passes through the hollow ring gear shaft 12a to be connected to the clutch C0 and is connectable with the first motor shaft 46 or the motor MG1 by means of the clutch C0. Either the second speed gear train (gear 62a) or the fourth speed gear train (gear 64a) in the second speed change mechanism of the transmission 60 is selectively fixed to the first motor shaft 46 by means of the clutch C2. As discussed above, the hybrid vehicle of the embodiment may have the construction as the front-wheel drive vehicle.

The embodiment and its modified examples discussed above are to be considered in all aspects as illustrative and not restrictive. There may be many other modifications, changes, and alterations without departing from the scope or spirit of the main characteristics of the present invention.

The power distribution integration mechanism 40 constructed as the double-pinion planetary gear mechanism may be arranged to have a gear ratio ρ satisfying a relation of ρ>0.5. In this modified structure, the reduction gear mechanism 50 may be arranged to have a speed reduction ratio of close to (1−ρ)/ρ and located between the sun gear 41 and either the motor MG1 or the motor MG2. The power distribution integration mechanism provided in the hybrid vehicle 20 may be constructed as a planetary gear mechanism including a first sun gear and a second sun gear having different numbers of teeth and a carrier arranged to hold at least one stepped gear including a first pinion gear engaging with the first sun gear in connection with a second pinion gear engaging with the second sun gear. In the structure of the embodiment discussed above, the clutch C0 is provided between the sun gear 41 as the second element of the power distribution integration mechanism 40 and the motor MG1 as the second motor to connect and disconnect the sun gear 41 with and from the motor MG1. The clutch C0 may be provided between the carrier 45 as the first element of the power distribution integration mechanism 40 and the motor MG2 as the first motor to connect and disconnect the carrier 45 with and from the motor MG2 or may be provided between the ring gear 42 as the third element of the power distribution integration mechanism 40 and the crankshaft 26 of the engine 22 to connect and disconnect the ring gear 42 with and from the crankshaft 26. Either of the hybrid vehicles 20 and 20A of the embodiment and its modified example discussed above may be constructed as a rear-wheel drive-based four-wheel drive vehicle or a front-wheel drive-based four-wheel drive vehicle. The above embodiment and its modified example describe the power output apparatuses mounted on the hybrid vehicles 20 and 20A. The power output apparatus of the invention is, however, not restrictively applied to such hybrid vehicles but may be mounted on diversity of moving bodies including various vehicles other than motor vehicles, boats and ships, and aircraft or may be built in stationary equipment, such as construction machinery.

INDUSTRIAL APPLICABILITY

The technique of the invention is applicable to the manufacturing industries of power output apparatuses and motor vehicles.

The invention claimed is:

1. A power output apparatus configured to output power to a driveshaft, the power output apparatus comprising:
    an internal combustion engine;
    a first motor constructed to input and output power;
    a second motor constructed to input and output power;
    an accumulator arranged to transmit electric power to and from each of the first motor and the second motor;
    a power distribution integration mechanism configured to have a first element connecting with the rotating shaft of the first motor, a second element connecting with the rotating shaft of the second motor, and a third element connecting with an engine shaft of the internal combustion engine and arranged to allow mutually differential rotations of the three elements;
    a connecting-disconnecting device configured to attain driving source element connection and release of the driving source element connection, the driving source element connection being any one of connection of the first motor with the first element, connection of the second motor with the second element, and connection of the internal combustion engine with the third element;
    a speed change-transmission assembly configured to selectively connect either one or both of a rotating shaft of the first motor and a rotating shaft of the second motor to the driveshaft and transmit the output power from the first motor and the output power from the second motor to the driveshaft at preset speed ratios;
    a power demand setting module configured to set a power demand as a power required for the driveshaft; and
    a controller configured to control the first motor and the second motor so as to make a level of heat generation in the first motor substantially equivalent to a level of heat generation in the second motor and ensure output of a power equivalent to the set power demand to the driveshaft in a state that both of the first motor and the second motor are connected to the driveshaft by means of the speed change-transmission assembly, the driving source element connection is released by the connecting-disconnecting device and operation of the internal combustion engine is stopped.

2. The power output apparatus in accordance with claim 1, wherein the controller sets target powers, which are to be output from the first motor and from the second motor, based on the set power demand, in order to minimize a total of a loss of the first motor and a loss of the second motor.

3. A motor vehicle equipped with drive wheels driven with power from a driveshaft, the motor vehicle comprising:
an internal combustion engine;
a first motor constructed to input and output power;
a second motor constructed to input and output power;
an accumulator arranged to transmit electric power to and from each of the first motor and the second motor;
a power distribution integration mechanism configured to have a first element connecting with the rotating shaft of the first motor, a second element connecting with the rotating shaft of the second motor, and a third element connecting with an engine shaft of the internal combustion engine and arranged to allow mutually differential rotations of the three elements;
a connecting-disconnecting device configured to attain driving source element connection and release of the driving source element connection, the driving source element connection being any one of connection of the first motor with the first element, connection of the second motor with the second element, and connection of the internal combustion engine with the third element;
a speed change-transmission assembly configured to selectively connect either one or both of a rotating shaft of the first motor and a rotating shaft of the second motor to the driveshaft and transmit the output power from the first motor and the output power from the second motor to the driveshaft at preset speed ratios;
a power demand setting module configured to set a power demand as a power required for the driveshaft; and
a controller configured to control the first motor and the second motor so as to make a level of heat generation in the first motor substantially equivalent to a level of heat generation in the second motor and ensure output of a power equivalent to the set power demand to the driveshaft in a state that both of the first motor and the second motor are connected to the driveshaft by means of the speed change-transmission assembly, the driving source element connection is released by the connecting-disconnecting device and operation of the internal combustion engine is stopped.

4. A control method of a power output apparatus, the power output apparatus including: a driveshaft; an internal combustion engine; a first motor and a second motor respectively constructed to input and output power; an accumulator arranged to transmit electric power to and from each of the first motor and the second motor; a power distribution integration mechanism configured to have a first element connecting with the rotating shaft of the first motor, a second element connecting with the rotating shaft of the second motor, and a third element connecting with an engine shaft of the internal combustion engine and arranged to allow mutually differential rotations of the three elements; a connecting-disconnecting device configured to attain driving source element connection and release of the driving source element connection, the driving source element connection being any one of connection of the first motor with the first element, connection of the second motor with the second element, and connection of the internal combustion engine with the third element; and a speed change-transmission assembly configured to selectively connect either one or both of a rotating shaft of the first motor and a rotating shaft of the second motor to the driveshaft and transmit the output power from the first motor and the output power from the second motor to the driveshaft at preset speed ratios, the control method comprising:
controlling the speed change-transmission assembly to connect both the first motor and the second motor to the driveshaft in a state that the driving source element connection is released by the connecting-disconnecting device and operation of the internal combustion engine is stopped; and
controlling the first motor and the second motor to make a level of heat generation in the first motor substantially equivalent to a level of heat generation in the second motor and to ensure output of a power, which is equivalent to a power demand as a power required for the driveshaft, to the driveshaft.

5. The control method of the power output apparatus in accordance with claim 4, wherein the target powers, which are to be output from the first motor and from the second motor are set based on the power demand, in order to minimize a total of a loss of the first motor and a loss of the second motor.

* * * * *

UNITED STATES PATENT AND TRADEMARK OFFICE
CERTIFICATE OF CORRECTION

PATENT NO. : 7,931,102 B2
APPLICATION NO. : 12/515881
DATED : April 26, 2011
INVENTOR(S) : Hiroshi Katsuta et al.

It is certified that error appears in the above-identified patent and that said Letters Patent is hereby corrected as shown below:

| Column | Line | |
|---|---|---|
| 17 | 45 | Change "ratio pr" to --ratio ρr--. |
| 17 | 53 | Change "ratio pr" to --ratio ρr--. |

Signed and Sealed this
Twenty-fifth Day of October, 2011

David J. Kappos
*Director of the United States Patent and Trademark Office*